United States Patent [19]

Poon et al.

[11] Patent Number: 5,938,594

[45] Date of Patent: Aug. 17, 1999

[54] METHOD AND APPARATUS FOR DETECTING NONLINEARITY AND CHAOS IN A DYNAMICAL SYSTEM

[75] Inventors: Chi-Sang Poon, Lexington, Mass.; Mauricio Barahona, Los Altos Hills, Calif.

[73] Assignee: Massachusetts Institute of Technology, Cambridge, Mass.

[21] Appl. No.: 09/078,122

[22] Filed: May 13, 1998

Related U.S. Application Data

[63] Continuation-in-part of application No. 08/645,793, May 14, 1996, Pat. No. 5,792,062.

[51] Int. Cl.$^6$ ............................................ A61N 5/00
[52] U.S. Cl. .................................................. 600/300
[58] Field of Search .................................. 600/300, 509, 600/518, 519

[56] References Cited

U.S. PATENT DOCUMENTS

| | | | |
|---|---|---|---|
| 5,201,321 | 4/1993 | Fulton | 128/702 |
| 5,321,409 | 6/1994 | Walker | 342/202 |
| 5,342,401 | 8/1994 | Spano et al. | 607/5 |
| 5,404,298 | 4/1995 | Wang et al. | 364/152 |
| 5,421,576 | 6/1995 | Yamazaki et al. | 273/138 A |
| 5,439,004 | 8/1995 | Duong-Van et al. | 128/705 |

FOREIGN PATENT DOCUMENTS 9213273  6/1992  WIPO.

OTHER PUBLICATIONS

Macdonald, J.R. et al: "Discrimination between equations of state", Journal of Research of the National Bureau of Standards, Section A (Physics and Chemistry), Sep.–Oct. 1971, USA, vol. 75A, No. 5, ISSN 0022–4332, pp. 441–453.

Melbin, J: "On a non linear describing function for bio–data", Medical Research Engineering, USA, vol. 12, No. 3, ISSN 0025–7508, pp. 23–29.

De Maine P A D et al: "A non–statistical program for automatic curve–fitting to linear and non–linear equations", Management Informatics, Oct. 1974, Netherlands, vol. 3, No. 5, ISSN 0300–1636, pp. 233–250.

"A Tutorial on Chaos in Control Theory", Thomas J. Taylor, IEEE (2102), 1992, pp. 2102–2106.

"The Identification of Nonlinear Biological Systems: Volterra Kernel Approaches", Korenberg et al., Annals of Biomedical Engineering, vol. 24, 1996, pp. 250–268.

Rovati G E: "A versatile implementation of the Gauss–Newton minimization algorithm using MATLAB for Macintosh microcomputers" Computer Methods and Programs in Biomedicine, Jun. 1990, Netherlands,, vol. 32, No. 2, ISSN 0169–2607, pp. 161–167.

"Controlling Chaotic Continuous–Time Systems via Feedback", Dong et al., IEEE (2502), 1992, pp. 2502 and one unnumbered page.

Chapter 10 "Nonlinear Systems Identifiecation", ©Copyright 1996 by C.S. Poon, pp. 1–13 including two unnumbered pages.

*Primary Examiner*—William E. Kamm
*Attorney, Agent, or Firm*—Daly, Crowley & Mofford, LLP

[57] ABSTRACT

Methods and apparatus are provided for detecting the presence of a nonlinear characteristic of an autonomous (i.e., non-driven and time-invariant), dynamical system and for determining whether such nonlinear dynamical system is chaotic. First, a system is determined to be either nonlinear or linear. If the system is determined to be nonlinear, then noise of increasing intensity is incrementally added to a data set representing the analyzed system until the resulting test signal appears to be linear. If the noise limit of the resulting test signal is significantly greater than zero, then the system is determined to be chaotic and the amount of noise added to the data set provides an indication of the relative strength of the chaos. Alternatively, if the noise limit of the resulting test signal is approximately zero, then the system is determined to be nonlinear with periodic or quasi-periodic limit cycles. An optional power spectrum test is described with which it can be confirmed that the system is nonlinear with periodic or quasi-periodic limit cycles.

17 Claims, 15 Drawing Sheets

METHOD AND APPARATUS FOR DETECTING NONLINEARITY AND CHAOS IN A DYNAMICAL SYSTEM

CROSS-REFERENCE TO RELATED APPLICATIONS

This application is a continuation-in-part application of U.S. patent application Ser. No. 08/645,793, filed May 14, 1996, now U.S. Pat. No. 5,702,062 entitled METHOD AND APPARATUS FOR DETECTING NONLINEARITY AN ELECTROCARDIOGRAPHIC SIGNAL.

STATEMENTS REGARDING FEDERALLY SPONSORED RESEARCH

This invention was made with government support under grant numbers N00014-95-1-0414 awarded by the Office of Naval Research, Department of Defense and HL50614 awarded by the National Institutes of Health. The government has certain rights in the invention.

BACKGROUND OF THE INVENTION

As is known in the art, a dynamical system is a system having output values which vary with respect to time. The time-changing output values at one time are interrelated with those at other times.

A linear dynamical system is a system in which a relatively small change in an initial condition of the system produces a relatively small and quantifiable or predictable change in an output state of the system. A nonlinear dynamical system, on the other hand, may exhibit a relatively sensitive dependence on system initial conditions. Thus, a relatively small or even a virtually unmeasurable difference in system initial conditions can result in nonpredictable system output states. Such output states may in some instances have relatively large differences between them despite the relatively small differences in initial conditions of the system.

This causes the output states of some dynamical systems to appear to be random in nature. Many activities which appear to be random in nature are actually examples of a deterministic phenomenon referred to as chaos. The phenomena that have been shown to exhibit chaos include but are not limited to the transition from fluid flow to turbulent flow in fluids, many types of mechanical vibrations, irregular oscillations, chemical reactions, a rise and fall of epidemics, the irregular dripping of a faucet, and the behavior of biological systems including human cardiac systems. Generally, chaotic systems are relatively sensitive to perturbations of their initial condition.

Typically, systems exhibiting a chaotic behavior are analyzed by developing a model of the system sufficiently detailed to identify one or more key parameters of the system. One problem with this approach, however, is that this technique is typically useful in systems for which a theoretical model is known and which do not display irreversible parametric changes. Such parametric changes, however, may sometimes themselves be the very changes causing the chaos.

It has been recognized that electrical signals produced by a human heart reflect the activity of a nonlinear dynamical system which may be described using chaos theory. Thus, the human heart may be referred to as nonlinear dynamical or chaotic system. Dynamical systems such as the heart can exhibit both periodic and chaotic behavior depending upon certain system parameters. These parameters appear as constants in mathematical equations describing the system. The chaotic behavior exhibited by the heart, however, is not immediately obvious when looking, for example, at an electrocardiograph (ECG) signal.

One way to observe the chaotic behavior of the heart has been to plot the interbeat spacing or its reciprocal (i.e. heart rate) at a time n against the interbeat spacing (or heart rate) at time n+1. Such a plot is referred to as a Poincare map or a return map. One problem with this technique, however, is that a relatively large amount of data is required to provide an accurate representation of the system. Furthermore, problems arise in collecting large amounts of data from biosystems. For example collection of a relatively large amount of bioelectric data on a human heart requires a human to wear a monitor or sensor for a relatively long period of time. Similarly, collection of a large number of human fluid samples requires a human to be struck with a syringe or other fluid drawing device. Moreover, relatively large processing power is required to analyze the large amount of data retrieved from the human subject or other bio system. The need to process such large amounts of data makes it relatively difficult to provide a real time processing system. Furthermore, a relatively large amount of storage capacity is required to store the large amount of collected data. Finally, the system under study may be non-stationary (i.e., may vary) over a long period of time and thus, a large data set collected over a long time interval may not accurately reflect the behavior of the system.

It would, therefore, be desirable to provide a technique which can be used to detect the presence of nonlinearity in a dynamical system. It would also be desirable to determine whether nonlinear dynamical systems are chaotic systems. It would further be desirable to provide a technique for diagnosing disease in biosystems by detecting the presence of chaos in a biosignal (e.g. based upon their nonlinear or chaotic behavior). For example, it would be desirable to diagnose heart disease or heart failure by detecting the presence of chaos in an ECG signal.

BRIEF SUMMARY OF THE INVENTION

In accordance with the present invention, apparatus and methods are described for detecting nonlinearity in an autonomous (i.e., non-driven and time-invariant), dynamical system and for determining whether the nonlinear system is chaotic. In one embodiment, the method for detecting nonlinearity includes the steps of representing a data set from the dynamical system with a linear model and a nonlinear model, comparing a performance measure of the linear model to a performance measure of the nonlinear model, and identifying which of the two performance measures is a preferred performance measure.

The method for determining whether the nonlinear dynamical system is chaotic includes the steps of adding a noise signal to the data to provide a test signal and determining whether the test signal appears linear. In response to the test signal not being linear, a further noise signal is added to the test signal to provide a next test signal. The above described steps are repeated until it is determined that the next test signal resembles a linear system.

Further processing steps include determining whether the noise limit of the next test signal which resembles a linear system is greater than zero. The analyzed system is determined to be chaotic if the noise limit is greater than zero. Alternatively, if the noise limit is approximately zero, then the system is determined to be nonlinear but non-chaotic.

The intensity of detected chaos is indicated by the magnitude of the noise signal added to provide the next test signal which represents a linear system. Stated differently, the amount of noise the dynamical system signal can tolerate before providing a test signal representing a linear system is indicative of the amount of chaos exhibited by the system.

With this particular arrangement, a robust test is provided for detecting nonlinearity and the presence of chaos in an autonomous (i.e., non-driven and time-invariant), dynamical system and the extent of any such chaos. The effectiveness of the described technique is based on a recognition that the presence of chaos can be reliably tested by adding noise, since, in the presence of noise, non-chaotic forms of nonlinear determinism, such as limit cycles and quasiperiodicity, become indistinguishable from oscillatory linear systems.

In accordance with a further aspect of the invention, a signal processing system includes a modeling system for providing a linear model and a nonlinear model from a data set and a performance measurement system for comparing the linear model to the nonlinear model, identifying the data set as either containing or not containing a nonlinear component, and determining whether an analyzed system containing a nonlinearity is chaotic. The modeling system includes a performance processor for computing a performance measure of the linear model and a performance measure of the nonlinear model.

A first portion of the performance measurement system is operative to determine whether the data contains a nonlinear component and includes a comparison processor for comparing the performance measure of the linear model with the performance measure of the nonlinear model and a selection processor for identifying which of the two performance measures is a preferred performance measure. In response to such identification, the selection processor further provides an output signal indicating whether the analyzed system includes a nonlinear component.

A second portion of the performance measurement system is operative to determine whether the analyzed system is chaotic and includes a noise processor for incrementally adding noise of increasing intensity to the data set to generate one or more test signals until the test signal is determined to be linear. The chaos determining portion of the performance measurement system further includes a noise limit comparator for determining whether the noise limit of the linear test signal is greater than zero and for providing an output signal indicating that the analyzed system is chaotic in response to the noise limit being greater than zero. The noise limit comparator further provides an output signal indicating the strength of the chaos as a function of the level of noise added to the data set to provide the linear test signal.

An optional, additional portion of the performance measurement system is provided for determining whether a system determined to be nonlinear by the above criteria contains periodic or quasi-periodic limit cycles. The optional portion includes a power spectrum processor for computing the power spectrum of the data set and a frequency peak detector. The frequency peak detector is operative to determine whether the frequency domain representation of the data set generated by the power spectrum processor includes any discernible frequency peaks and provides an output signal indicating that the system is nonlinear with periodic or quasi-periodic limit cycles in response to detection of discernible frequency peaks.

With these arrangements, apparatus and methods are provided for identifying nonlinearity in a signal generated by an autonomous (i.e., non-driven and time-invariant), dynamical system and for determining whether the analyzed system is chaotic. Further, the relative strength of the detected chaos can be determined with the present invention based on the recognition that if the system is immune to a large amount of noise, then the system is strongly chaotic; whereas, if the system is not immune to a large amount of noise, then it is weakly chaotic.

The above-described apparatus and techniques are particularly well-suited for use in biological diagnostic systems in which the analyzed data set corresponds to RR intervals of an electrocardiograph signal. The strength of chaos detected in such systems has a high correlation to the health of the patient's heart. In particular, it has been recognized that the electrocardiograph signals of healthy cardiac patients exhibit a high degree of chaos, whereas patients with compromised cardiac health and, in particular, with congestive heart failure (CHF), generally have electrocardiograph signals exhibiting significantly less chaos.

BRIEF DESCRIPTION OF THE DRAWINGS

The foregoing features of the invention, as well as the invention itself may be more fully understood from the following detailed description of the drawings, in which.

DESCRIPTION OF PREFERRED EMBODIMENT

Figure 1:
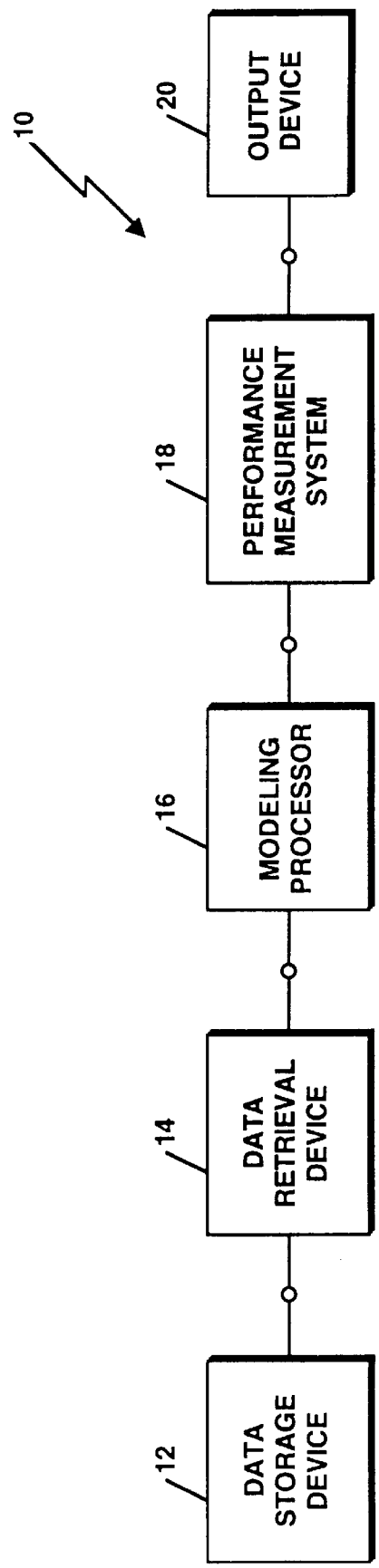
FIG. 1 is a block diagram of signal processing system for detecting nonlinearity in a signal.

Referring now to FIG. 1, a signal processing system 10 includes a data storage device 12 having stored therein data from an autonomous (i.e., non-driven and time-invariant), dynamical system to be modeled. The stored data may correspond to analog data or digital data. The data stored in data storage device 12 may correspond, for example to a sequence of output states or values $y_n$, (where n=1 ... N) of an autonomous, dynamical system. As mentioned above, the output states of an autonomous, dynamical system vary as a function of time. Such a sequence of output values $y_n$, are typically measured or observed by an appropriate sensor or measurement device and may be referred to as time series values. The output sequence $y_n$, is thus collected and stored as a data sequence in the storage device 12.

Typically the time series values are converted to discrete output values and stored in storage device 12 as sequence of digital data values. It should be noted, however, that in some applications it may be desirable to store the time series values as analog or continuous parameter values and later sample the stored continuous parameter signal to provide discrete data samples. Thus data storage device may be provided, for example, as a compact disk read only memory (CD ROM), a random access memory (RAM), a magnetic tape, a hard drive, a mass storage system or the like.

The data storage device 12 has coupled thereto a data retrieval device 14 which retrieves data from the data storage device 12 and provides the data to a modeling system 16. Modeling system 16 generates a mathematical representation of the system which generates the data stored in storage device 12. The process of obtaining such a mathematical representation is typically referred to as modeling and the final mathematical representation is referred to as a model. The model is then used to predict future time series values from measured or detected time series values.

Modeling system 16 uses the data retrieved by data retrieval device 14 to generate a plurality of linear models and a plurality of nonlinear models. Each of the linear and nonlinear models thus represent the system which generated the data stored in data storage device 12 and may be used to predict the value of future data point in the time series. The particular form of the models will be described in detail below. Suffice it here to say, however, that any type of model capable of adequately representing a particular type of dynamical system may be used.

It should be noted that in accordance with conventional mathematical definitions every type of model may be classified as either a linear model or a nonlinear model. It is recognized, however, that in practice some models may be described as weakly nonlinear or strongly nonlinear. A weakly nonlinear model is a model having a nonlinear component which contributes relatively little to the model (i.e. a so-called weak nonlinear component). Since the model includes a nonlinear component, the model thus meets the strict mathematical definition of a nonlinear model. A weakly nonlinear model, however, includes a linear component which dominates the characteristic of the model causing the model to behave as a linear model. For the purposes of the present application, a weakly nonlinear model will thus be referred to simply as a linear model.

A strongly nonlinear model includes at least one nonlinear component and thus also meets the strict mathematical definition of a nonlinear model. The nonlinear component of a strongly nonlinear model, however, dominates the characteristic of the model causing the model to behave as a nonlinear model. For the purposes of the present application, a strongly nonlinear model will thus be referred to simply as a nonlinear model.

The linear and nonlinear models are both fed to a performance measure system 18 which compares a performance measure of at least one linear model with a performance measure of at least one nonlinear model. From the results of this comparison, the performance measure system 18 determines whether the data set retrieved by the data retrieval device 14 is best represented by the linear model or the nonlinear model.

If performance measure system 18 determines that the data set does not include a nonlinear signal component, and thus is best represented by the linear model, then the data set was generated by a linear dynamical system. If, on the other hand, performance measure system 18 determines that the data set includes a nonlinear signal component, and thus is best represented by the nonlinear model, then the data set was generated by a nonlinear dynamical system. Furthermore, as will be described in detail below in conjunction with FIGS. 2–2B, performance measure system 18 can determine if the nonlinear signal component is a chaotic signal component. The performance measure system 18 provides an output signal to an output device 20 which provides an indication of whether the data set includes a nonlinear component.

Typically, an autonomous (i.e., non-driven and time-invariant), dynamical system can be described as a black box having an input sequence $x_n$ and an output sequence $y_n$ at time $n = 1, \ldots, N$ in multiples of the sampling time T. In accordance with the present invention, a closed-loop version of the Volterra series in which the output $y_n$ loops back as a delayed input (i.e. $x_n = y_{n-1}$) may be used to represent the dynamical system including those dynamical systems provided as strictly autonomous dynamical systems or dynamical systems which have been reformulated as such. Within this framework, a univariate time series may be analyzed by using a discrete Volterra-Wiener-Korenberg series of degree d and memory k as a model to calculate a predicted time series $y_n^{calc}$ as shown in Equation (1) below:

$$y_n^{calc} = a_0 + a_1 y_{n-1} + a_2 y_{n-2} + \ldots a_k + a_1 y_{n-k} +$$
$$a_{k+1} y_{n-1}^2 + a_{k-2} y_{n-1} y_{n-2} + \ldots a_{M-1} y_{n-k}^d$$
$$= \sum_{m=0}^{M-1} a_m z_m(n)$$

Equation (1)

in which:
 $a_n$=coefficients of the polynomial for n=0 to N;
 k=an embedding dimension;
 d=the degree of the polynomial function (i.e. the degree of nonlinearity of the model);
 M=a total dimension of the equation and may be computed as:

$$M=(k+d)!/(d!k!).$$

It should be noted that other forms of functional expansions are also possible. For example block-structured models may also be used. As can be seen from Equation (1) the set $\{Z_m(n)\}$ represents a functional basis composed of all the distinct combinations of the embedding space coordinates $(y_{n-1}, y_{n-2}, \ldots, y_{n-k})$ up to degree d, having a total dimension M. Thus, each model is parameterized by the embedding dimension k and the degree of the nonlinearity of the model d.

A recursive procedure is preferably used to estimate the values of the coefficients $a_m$. In a preferred embodiment, a Gram-Schmidt procedure from linear and nonlinear auto-correlations of the original data series itself may be used to compute values for the coefficients $a_m$. Those of ordinary skill in the art will recognize of course that other recursive and nonrecursive techniques may also be used to compute values of the coefficient $a_m$. Such computations may be performed, for example, on a workstation.

Next, a performance measure is computed for each of the models. For example, a short-term prediction power of a model may be measured by computing a one-step-ahead prediction error in accordance with Equation (2):

$$\epsilon(k,d)^2 \equiv \frac{\sum_{n=1}^{N}(y_n^{calc}(k,d)-y_n)^2}{\sum_{n=1}^{N}(y_n-\overline{y})^2} \quad \text{Equation (2)}$$

$\epsilon(k,d)^2$ is a value which corresponds to a normalized variance of the error residuals; and
$\overline{y}$ may be computed as:

$$\overline{y} = \frac{1}{N}\sum_{n=1}^{N}y_n$$

Once all of the models are computed or as the models are being computed, a search is performed to identify an optimum model $\{k_{opt}, d_{opt}\}$. The optimum model may be defined, for example, as the model which minimizes the following information criterion in accordance with the parsimony principle:

$$C(r) = \log \epsilon(r) + r/N$$

where:
$r \in [1, M]$ is the number of polynomial terms of the truncated Volterra expansions from a certain pair of embedding dimension values and degree of nonlinearity of the model (k,d).

Those of ordinary skill in the art will appreciate of course that other information criteria may also be used. The numerical procedure using the above information criteria is as follows: For each data series, identify the best linear model by searching for the linear model having an embedding dimension value in which minimizes the performance measure $C(r)$. It should be noted that the linear models are those models in which the degree of the polynomial function is 1 (i.e. d=1).

Similarly, the nonlinear model having an embedding dimension value $k^{nl}$ which minimizes the performance measure $C(r)$ is identified. It should be noted that the nonlinear models are those models in which the degree of the polynomial function is greater than 1 (i.e. d>1).

Next surrogate randomized data sets with the same autocorrelation (and power spectrum) as the original series are generated and optimum linear and nonlinear models are identified for the surrogate data sets. This results in four competing models having the following error standard deviations the surrogate data sets. This results in four competing models having the following error standard deviations $$\epsilon_{orig}^{lin}, \epsilon_{orig}^{nl}, \epsilon_{surr}^{lin}, \epsilon_{surr}^{nl}$$

in which
$\epsilon$ corresponds to the standard deviation;
the superscript lin denotes a linear model;
the superscript nl denotes a nonlinear model;
the subscript orig denotes an original data sequence; and
the subscript surr denotes a surrogate data sequence.

From above, the presence of nonlinear determinism is indicated if the optimum model (i.e. the model which minimizes the information criterion given above) has a polynomial of degree greater than 1 (i.e. $d_{opt}>1$). Further corroboration may be obtained with the following objective statistical criteria: For models having gaussian residuals, a standard F-test will serve to reject, with a certain level of confidence, the hypothesis that nonlinear models are not better than linear models as one-step-ahead predictors. This gaussian assumption may be tested by using an $x^2$-test with a 99% cutoff.

Alternatively, the results may be confirmed using a non-parametric Mann-Whitney rank-sum statistic, which does not depend on a gaussian assumption. Under this scheme, the relevance of nonlinear predictors is established when the best nonlinear model from the original data is significantly more predictive than both (a) the best linear model from the data series, and (b) the best linear and nonlinear models obtained from the surrogate series. This may be expressed as:

$$\epsilon_{orig}^{lin}, \epsilon_{surr}^{nl}, \epsilon_{surr}^{lin} > \epsilon_{orig}^{nl}$$

where the comparisons are made in the statistical sense.

It should, however, be noted that since surrogate data are generated by preserving only the linear autocorrelation function of the data series (nonlinear autocorrelations are randomized), the addition of nonlinear terms does not increase the prediction power and the one step ahead prediction error for the nonlinear model using the surrogate data set is approximately equal to the one step ahead prediction error for the linear model using the surrogate data set. This may be expressed as:

$$\epsilon_{surr}^{nl} \approx \epsilon_{surr}^{lin}$$

Furthermore, surrogate data are always best approximated by a linear model.

Figure 5:
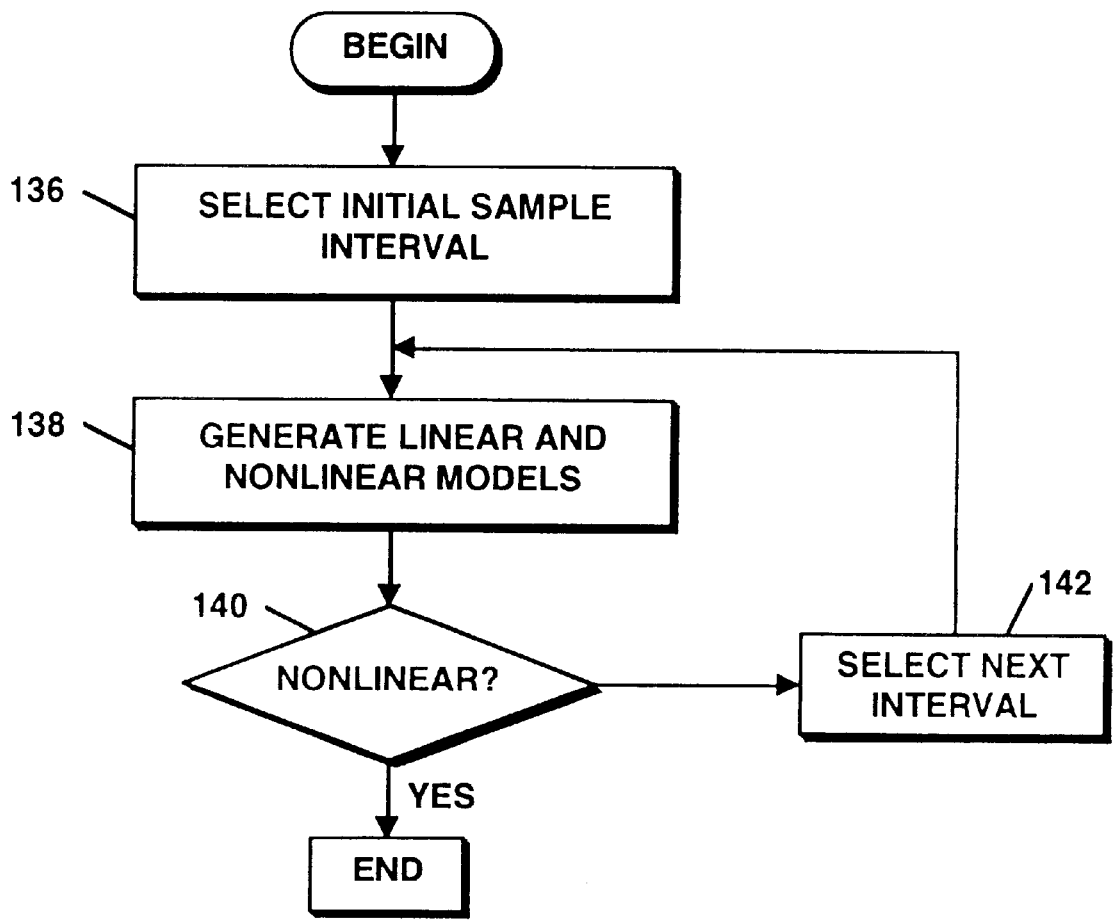
FIG. 5 is a flow diagram which illustrates the steps in selecting a sample interval.

It should also be noted that, when dealing with continuous signals, the time delay T for the embedding (or optimal sampling rate) is another free parameter to be determined. Selection of the time delay T will be described in detail below in conjunction with FIG. 5. Suffice it here to say that for detection purposes, an optimal time delay $T_{opt}$ may be selected to maximize the difference between the one step ahead prediction error for the nonlinear model using the original data set $\epsilon_{orig}^{lin}$ and the one step ahead prediction error for the nonlinear model using the original data set $\epsilon_{orig}^{nl}$.

Furthermore, it should be noted that the value of optimum sampling interval $T_{opt}$ is bounded by two limits. On one hand, if the sampling interval is much greater than the optimum sample interval $T_{opt}$ (i.e. $T>>T_{opt}$) then the sequence is being undersampled and all four models (linear and nonlinear, original or surrogate) will have similarly small prediction powers and nonlinearity cannot be detected. On the other hand, for an over sampled data series having a relatively small step size (e.g. $T>>T_{opt}$), the linear correlation of the embedding is so large that linear models always prevail. That is, the linear model will always appear to best represent the data set. Within the range of acceptable time delays which includes $T_{opt}$, generally the standard deviation of the linear models for both the original and surrogate data sets are approximately equal in $\epsilon_{orig}^{lin} \approx \epsilon_{surr}^{lin}$. That is, when optimally sampled, the prediction power of the linear model of a continuous signal derives mainly from its autocorrelation function. This equivalence of linear models from original and surrogate data holds for discrete maps as well. Consequently, and in contrast with other methods, surrogate data play only a confirmatory role (rather than a predicatory role) in the present technique.

The technique of the present invention can be used to detect nonlinearity in relatively short time series. For example nonlinearity may be detected in data sequences having as few as one thousand points or less.

The technique of the present invention was tested with several linear signals which, in some cases, proved to be non-recognizable by some conventional methods. The examples included: white gaussian and colored $1/f^\alpha$ noises; an autoregressive linear random process; periodic-sinusoidal and nonsinusoidal—series; as well as a quasi periodic signal from a torus with two frequencies. In all cases the technique yielded $\epsilon_{lin} \leq \epsilon_{nl}$ and the linear hypothesis could not be rejected. The same conclusion was reached in the presence of noise or when an a posteriori nonlinear transformation was performed on original linear data.

Table 1, below summarizes some of the results obtained using the technique of the present invention and the Volterra-Wiener-Korenberg algorithm for numerically generated nonlinear examples. Table I illustrates the maximum noise rejection obtained using the techniques of the present invention for a plurality of different dynamical systems.

TABLE I

| Discrete Systems | % Additive Noise | Continuous System | % Additive Noise |
| --- | --- | --- | --- |
| Logistic map | 70 | Rossler | 75 |
| Henon map | 70 | Duffing | 40 |
| Ikeda map | 65 | Lorenz II | 50 |
| Ecological model | 50 | Series D | 50 |
| Non chaotic fractal | 25 | Mackey-Glass | 15 |

It should be noted that Table I includes diverse data sets. For example, most of the discrete series (except the Hénon and logistic maps) have non-polynomial, non-Volterra functional forms. The detection technique of the present invention worked equally well with continuous systems including those that evolve around several ghost centers such as Lorenz, Duffing; high dimensional systems; and chaotic series from nonlinear delayed feedback mechanisms (commonly referred to as the Mackey-Glass equation) with implicit high dimensionality.

It should also be noted that the technique of the present invention is effective in the presence of noise. The technique of the present invention may be used to detect nonlinearity even after the addition to each of the nonlinear examples white and/or colored measurement noises—the latter with the same autocorrelation as the original series (Table 1). Thus, even with relatively short series, nonlinearity may be detected under relatively high levels of noise (~40–75%).

It should further be noted that although the choice of model selection criterion is not critical for the present purpose, the reliability of the resulting models as long-term predictors is dependent on the chosen criterion, the nature of the time series and the amount of noise present in the time series. It should also be noted that the technique of the present invention can be extended to non-polynomial functional bases or multivariate series. However, these approaches may not be feasible for large-scale functional expansions unless efficient techniques (such as the recursive technique described herein) become available.

Figure 1A:
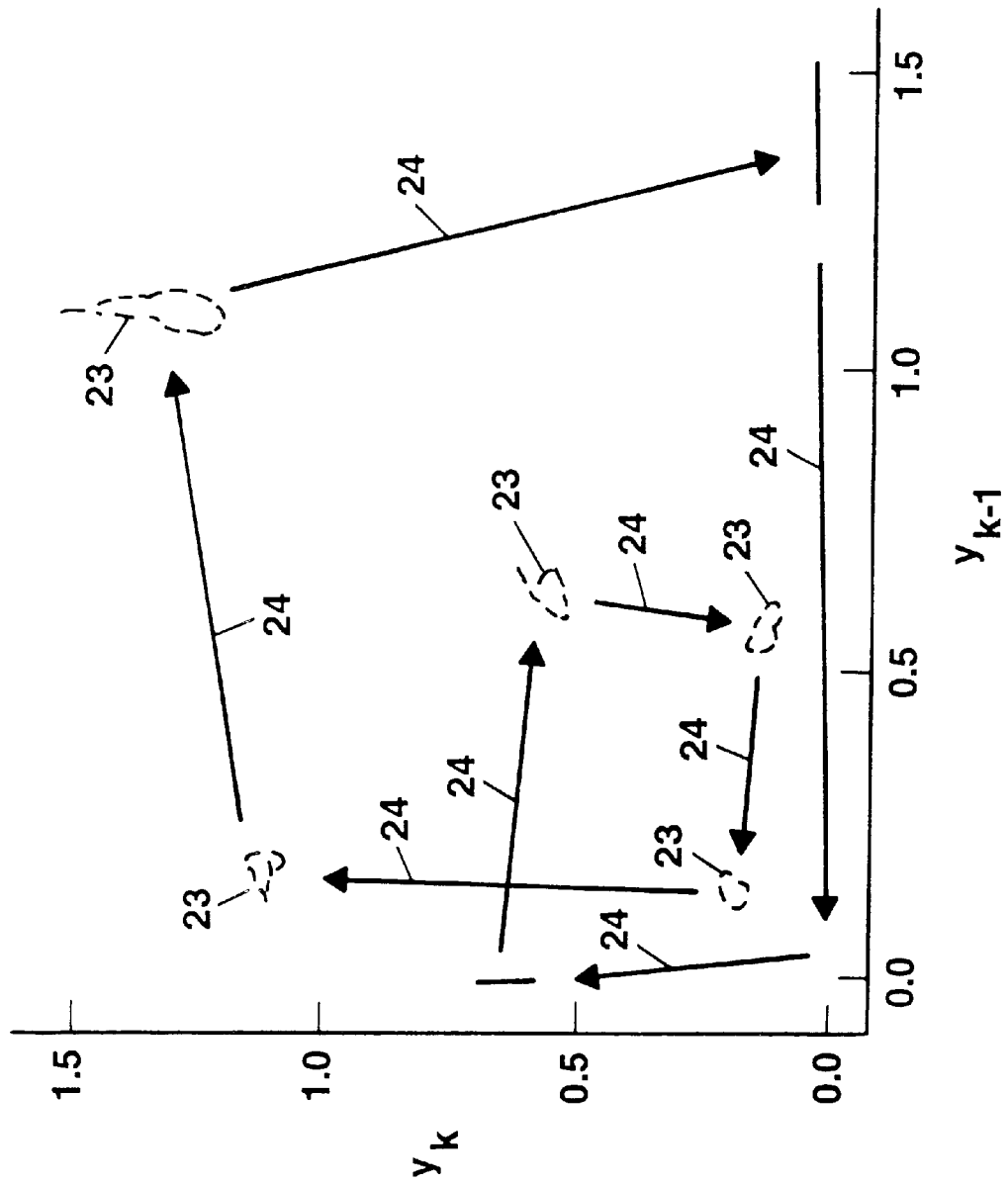
FIG. 1A is a plot of a sequence having a chaotic component.

Referring briefly to FIG. 1A, a plot of a trajectory of an attractor is shown. As can be seen, the trajectory includes fractals in several disconnected domains 23. As shown in the plot, the attractor moves to each of the domains 23 in a periodic manner as indicated by arrows 24. Thus, although the sequence is periodic, the values in each domain 23 are not identically the same each time the system enters the domain. This strong periodicity makes detection of the chaotic component difficult because the values of the sequence do not ever exactly repeat. The technique of the present invention, however, may be used to detect such chaotic components in periodic sequences.

Figure 2:
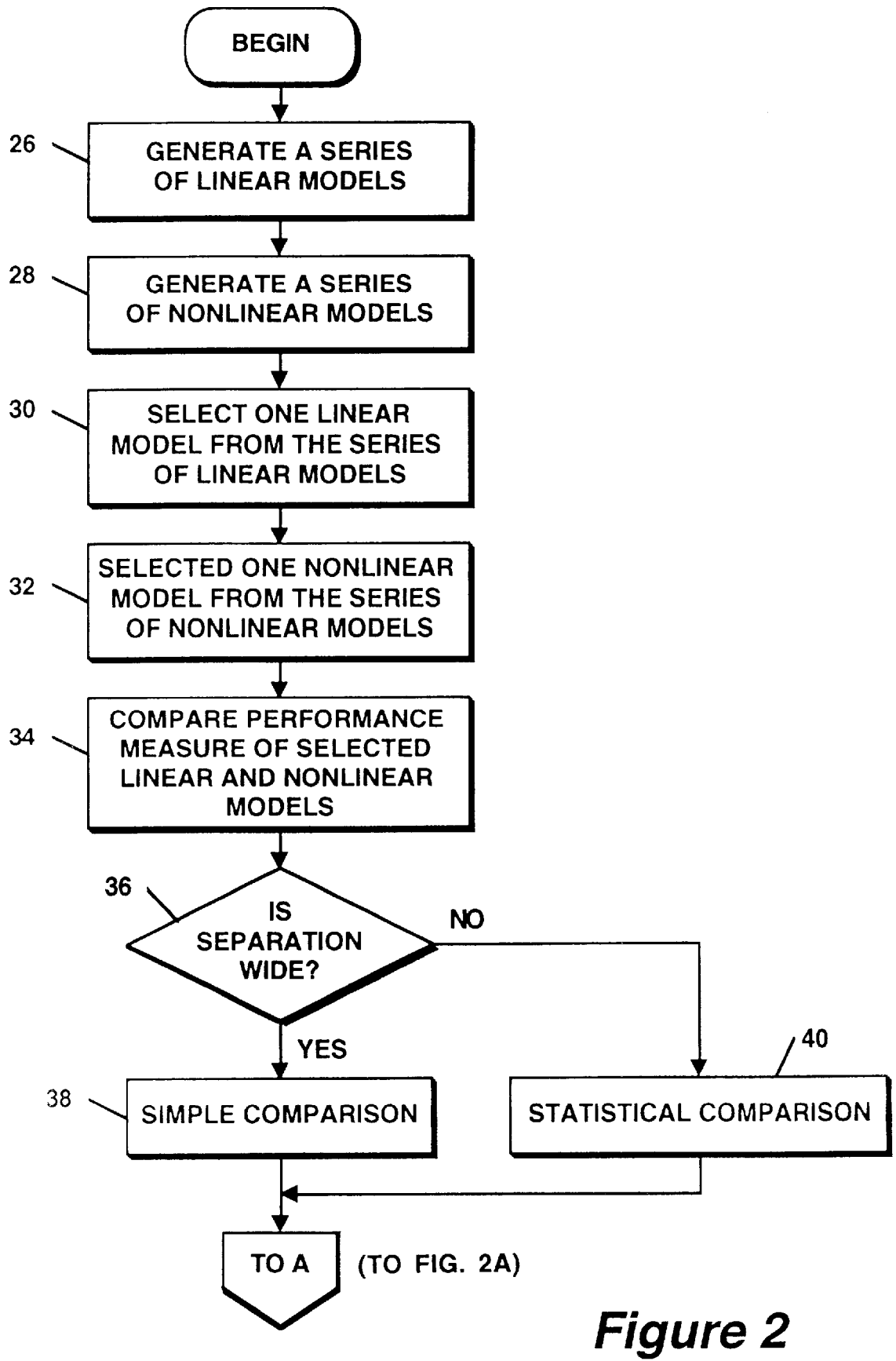
FIGS. 2–2A are a series of flow diagrams of the processing preformed by the system of FIG. 1 to determine whether a data set includes nonlinear components.
Figure 2A:
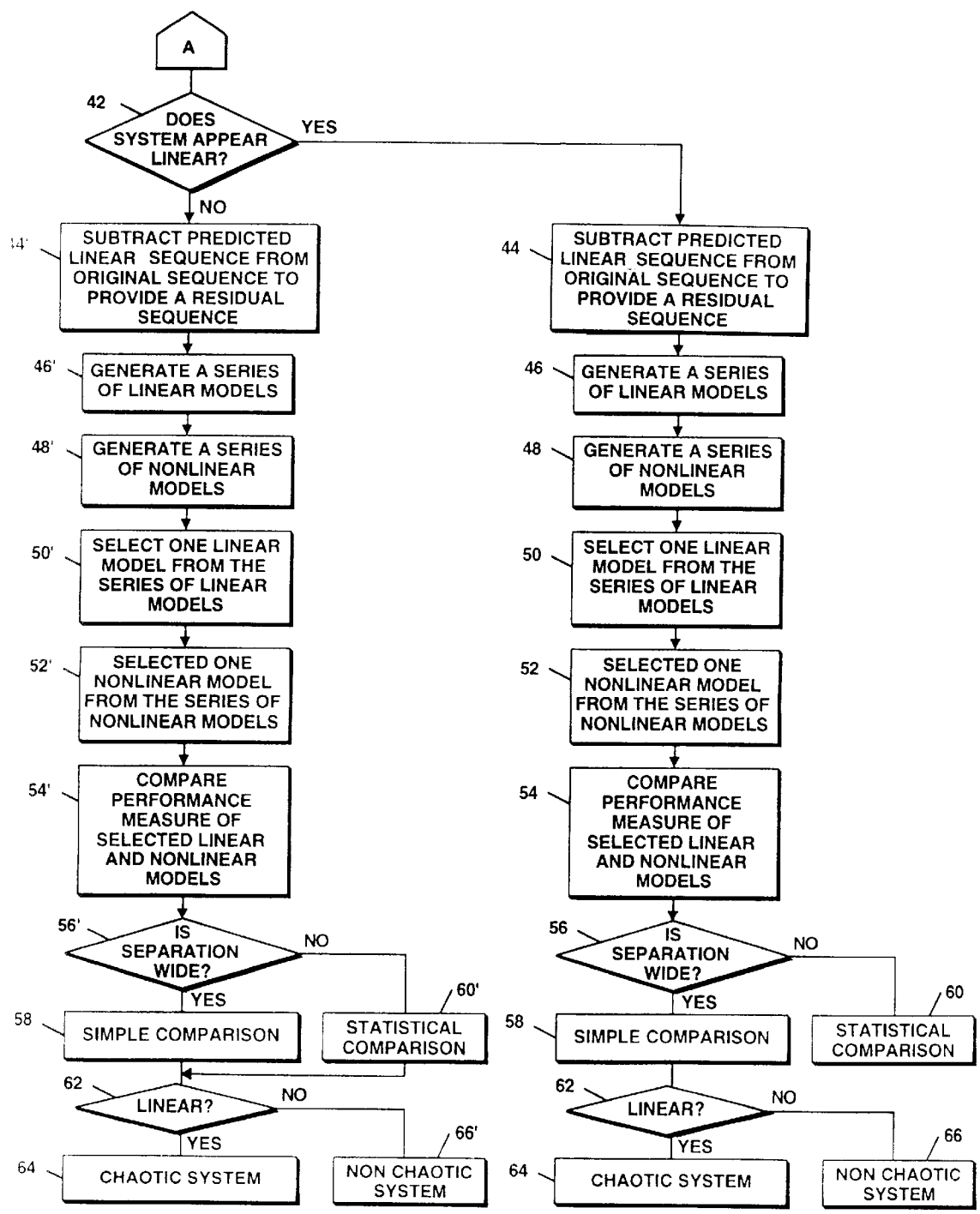

FIGS. 2 and 2A show a flow diagram of the processing performed by apparatus 10 to determine whether data stored on storage device 12 includes a nonlinear signal component. The rectangular elements (typified by element 26), herein denoted "processing blocks," represent computer software instructions or groups of instructions. The diamond shaped elements (typified by element 36), herein denoted "decision blocks," represent computer software instructions, or groups of instructions which affect the execution of the computer software instructions represented by the processing blocks. The flow diagram does not depict syntax of any particular programming language. Rather, the flow diagram illustrates the functional information one skilled in the art requires to generate computer software to perform the processing required of apparatus 10. It should be noted that many routine program elements, such as initialization of loops and variables and the use of temporary variables are not shown.

Turning now to FIGS. 2 and 2A, as shown in steps 26, 28, a series of linear models and nonlinear models are obtained for a data sequence. The data sequence may be collected and stored in a storage device or alternatively the data sequence may be collected and the linear and nonlinear models may be generated in real time. In one embodiment, the linear and nonlinear models may be provided as a closed-looped version of the Volterra-Wiener-Korenberg series discussed above in conjunction with FIG. 1, in which an output value $y_n$ loops back as a delayed input (i.e. $x_n = y_{n-1}$). Those of ordinary skill in the art will recognize of course that any technique may be used to provide the models. For example, the models may be provided using a so-called block-structured procedure, a Lee-Schetzen procedure, a least squares procedure or any other recursive procedure well known to those of ordinary skill in the art. Other possible alternatives to the Volterra-Wiener-Korenberg series include neural nets, radial basis function networks, and local embedding maps. The Volterra-Wiener-Korenberg series discussed above, however, provides a computationally efficient and statistically stable technique for modeling the data. Such a computationally efficient and statistically stable technique is desirable to use in systems in which it is desirable to process noise corrupted data in real time.

Next, as shown in step 30, a particular linear model is selected from the series of linear models generated in step 26. To select the linear model, a performance measure of each of the linear models is selected and computed. The performance measure of each of the linear models are compared to each other. The particular linear model which is selected is the linear model having a preferred performance measure. It should be noted that in some applications the preferred performance measure may be specifically selected by a user of the system and may not necessarily correspond to an optimum or best performance measure. The selected linear model has a preferred performance measure.

Similarly, as shown in step 32, a particular one of the nonlinear models is selected from the series of nonlinear models generated in step 28. To select the particular nonlinear model, a performance measure of the model is identified and this performance measure is computed for each of the nonlinear models in the series of nonlinear models. The computed performance measures are compared and the nonlinear model having a preferred performance measure is selected. It should be noted that in some applications, the preferred performance measure may not correspond to an optimum or best performance measure.

It should be noted that any one of a plurality of performance measures including but not limited to the Akaike Information Criteria (AIC), a minimum description length measure, a log livelihood measure and a residual sum of square errors may also be used. The selection of a particular performance measure depends upon a variety of factors including but not limited to the particular type of system being analyzed (e.g. biological system, economic system, social system, etc . . . ), the particular type of signal being analyzed and the type of noise present noted that in some applications it may be desirable to use more than one performance measure. For example multiple performance measures may be used to aid in the determination of whether a system is linear or nonlinear. In this case a plurality of different criteria (e.g. three criteria) may be monitored and if a majority of the plurality of the criteria (e.g. two out of the three criteria) indicate that the data is nonlinear then the decision is made that the data is nonlinear.

The performance measures of the selected linear and nonlinear models having the preferred performance measures are then compared as shown in step 34. Next, as shown in decision block 36, a decision is made as to whether the separation between the performance measures of the selected linear and nonlinear models is relatively wide.

Figure 2B:
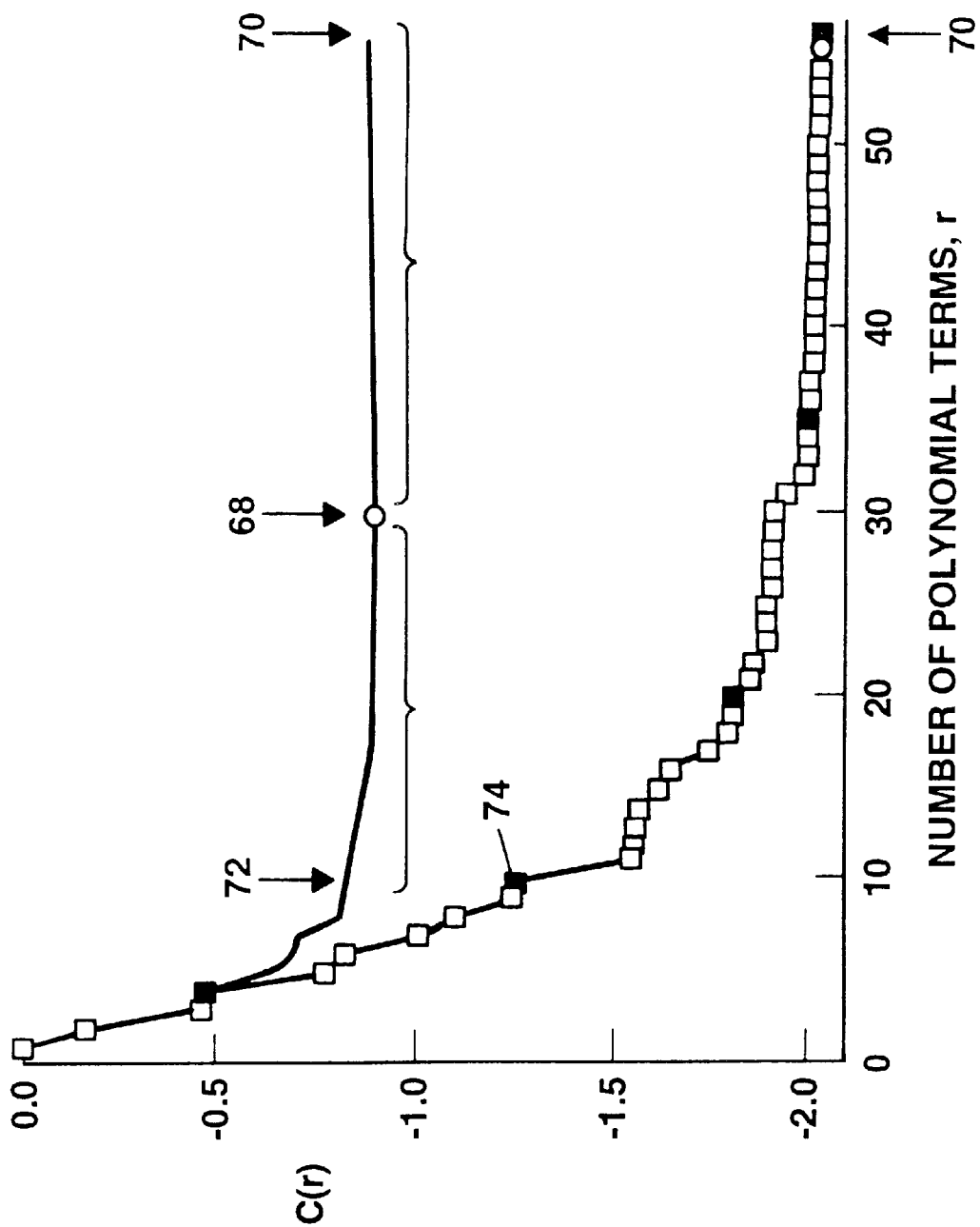
FIG. 2B is a plot of the Akaike information criterion versus the number of polynomial terms in a model.

For example, referring briefly to FIG. 2B, a plot of one type of performance measure versus the number of polynomial terms in a series of linear and nonlinear models is provided. In this particular example, the performance measure corresponds to the Akaike Information Criteria (AIC). Thus, the AIC of the linear model having the optimum AIC for that particular data set is compared to the AIC value of the nonlinear model having the optimum AIC for that particular data set.

As can be seen in the plot of FIG. 2B, the optimum AIC value of the linear model (indicated by arrow 68) occurs prior to reaching the maximum data points (indicated by arrow 70) available in the model. The optimum nonlinear model, however, corresponds to the maximum data point location of the model as indicated by reference designation 70. Thus, in this particular example, a relatively wide difference exists between the AIC value of the linear model and the AIC value of the optimum nonlinear model.

Accordingly, and referring again to FIG. 2, processing continues to step 38 where a comparison is performed between the preferred AIC value of the linear model and the preferred AIC value of the nonlinear model. Since in this case the two AIC values are separated by a relatively wide distance, a relatively simple comparison technique may be used to compare the two values. For example, the values may simply be compared to each other and the lowest AIC value selected.

It should be noted, however, that in cases where a relatively wide separation exists between performance measure values of a linear model and a nonlinear model, it may not be necessary to compute performance measure values for each of the models. For example, after computation of performance measure values at reference designations 72 and 74, a relatively wide separation between performance measure values exists. Thus, it may be desirable to stop computing performance measures for each of the models. Furthermore if the performance measures are being computed after each model is generated, then a determination of nonlinearity may be made after relatively few models have been generated thus increasing computational efficiency of the technique.

If the AIC values are not separated by a relatively wide margin, then it may be desirable to use a statistical approach as shown in step 40 to select between the preferred AIC value of the linear model and the preferred AIC value of the nonlinear model. In the case where the performance measure values are not separated by a relatively wide margin, it may be desirable for the preferred AIC values to correspond to the optimum AIC values for both the linear and nonlinear models.

Once the preferred AIC values are identified and compared, processing continues to decision block 42 where decision is made as to whether the system is linear. That is, if the linear model represents the system from which the data set is taken better than the nonlinear model, then the AIC value of the linear model will be lower than the AIC value of the nonlinear model. Thus, in this case, if the AIC value of the linear model is lower than the AIC value of the nonlinear model the system is identified as a linear system.

However, there are four possible states of an autonomous (i.e., non-driven and time invariant) system: (1) chaotic; (2) periodic; (3) quasi-periodic; and (4) equilibrium. Thus, if in step 42 decision is made that the data is linear, there may still be a hidden nonlinear component, i.e. a nonlinear component which is being marked by a strong linear component caused for example, by some baseline drift or periodic fluxuation in the signal. Thus it may be desirable to further process the data to determine whether a nonlinear component exists. If it is desirable to further process the data, then processing flows to steps 44–66 as shown.

It may be desirable to perform such processing since some signals can have both a chaotic component and a periodic or drift component. If the chaotic component is relatively or moderately strong compared with the periodic component, then the steps already taken will generally be sufficient to detect the nonlinear or chaotic component. If, however, the periodic component is very strong compared with the chaotic component, then it may be relatively difficult to detect the chaotic component. Thus, although the results of steps 28–42 may indicate that the system appears linear, processing in steps 44–60 enhances the detection of nonlinearity in a data set.

As shown in processing step 44, the predicted linear sequence is subtracted from the original sequence to produce a residual sequence. Then as shown in steps 46–60, linear and nonlinear models are generated, performance measures are computed and compared and processing flows to decision block 62 where a decision is then made as to whether the residual sequence is linear or not.

If the residual sequence is best represented as a linear model, then the system is identified as a linear system. If on the other hand the residual sequence is most accurately represented as a non linear model then the system is identified as a nonlinear system. The above technique may thus be used to differentiate between nonlinear periodic systems and nonlinear chaotic systems. Thus steps 44–60 are performed to aid in the detection of a hidden nonlinear component in a data set, i.e. a nonlinear component which is being masked by a strong linear component.

If on the other hand, as shown in FIG. 2B, the AIC value of the nonlinear model is lower than the AIC value of the linear model, then the system can be identified as a nonlinear system. Thus in step 42 decision is made that the system does not appear linear (i.e. it appears nonlinear). Although it has been found that when it is determined that the system is a nonlinear system it is often also a chaotic system, in some applications it may be desirable to further process the data as shown in steps 44'–66' which are substantially the same as steps 44–66. For example, a single system may exhibit both periodic and chaotic behavior. In accordance with the present technique the first analysis, as described in steps 26–40 above, determines that the system is nonlinear. It would be desirable, however, to perform steps 44'–66' to further insure that the nonlinear characteristic is in fact a chaotic characteristic rather than a periodic characteristic. Thus, to verify that the system is a nonlinear system which is chaotic, processing may optionally continue to processing step 44'–66' which are substantially the same as processing steps 44–66 discussed above. Thus, by subtracting the linear approximation of the periodic component from the original data set, it is possible to detect relatively small chaotic components which exist in a single system having both chaotic and periodic behavior.

Figure 3:
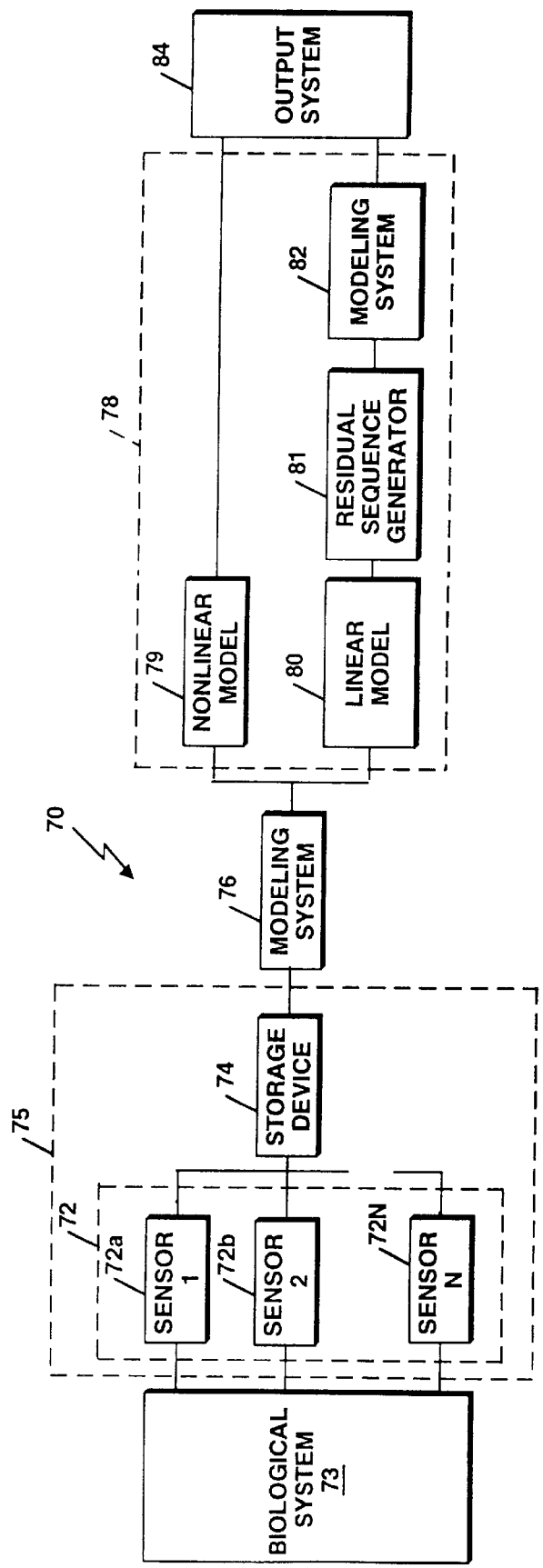
FIG. 3 is a block diagram of a biological diagnostic system.

Referring now to FIG. 3, a biological diagnostic system 70 includes a sensor system 72. In this particular embodiment, sensor system 72 is shown to include a plurality of sensor 72a–72N. Those of ordinary skill in the art will appreciate, of course, that sensor system 72 may include a single sensor. Each of the sensors 72a–72N are coupled to a biological system 73. Sensors 72a–72N are disposed to sense bioelectric, chemical, mechanical, electromagnetic, temperature and other characteristics of the biological system 73. Thus, sensors 72a–72N may correspond, for example, to electrocardiogram (ECG) electrodes, electroencephalograph (EEG) electrodes, blood or other fluid drawing devices, pressure sensors, motion sensors, vibration sensor or other mechanical motion sensors, electromagnetic sensors, and temperature sensors, etc.

Sensor system 72 could also include any data sampling devices such as analog to digital convertors or the like. Output signals from sensor 72 are fed to a storage device 74. Storage device 74 may be selected to store analog signals or digital signals. Storage device 74 is appropriately selected to receive and store output signals provided thereto from sensor 72. Thus, if sensor 72 provides a sequence of discrete data values as a stream of digital bits, then storage device 74 is provided as a digital data storage device such as a random access memory.

The data collected by sensor 72 is thus fed to storage device 74 and made available to a modeling system 76. Thus if biological system 73 is a human heart, for example, the sensors 72a–72N should preferably be provided as electrodes which detect the electrical activity of the heart. Thus in this case sensor 72 and storage device 74 may be provided, for example, as an electrocardiograph (ECG) monitor of the portable or stationary type.

Modeling system 76 receives the data from storage device 74 and generates a linear and nonlinear model of biological system 73 using the data fed thereto. The linear and nonlinear models are fed to a performance measurement system 78 which performs a comparison between the linear model and nonlinear models generated by modeling system 76. Such a comparison may be performed, for example, by comparing a performance measure of the linear model with a performance measure of the nonlinear model. It may, in some applications, be desirable to select the linear models and nonlinear models as the optimum models. Based upon the results of the comparison, performance measurement system 78 provides an output signal indicating whether the biological system 73 is most accurately represented by a linear or a nonlinear model. If the system is most accurately detected by the nonlinear model, then this indicates that the system detected a nonlinear component in the data set.

Performance measurement system 78 may optionally include a residual sequence generator 81, a residual modeling system 82 and an output system 84 coupled as shown. If performance measurement system 78 determines that biological system 73 is most accurately represented by a linear model, then the residual sequence generator 81 subtracts the linear data sequence predicted by the linear model 80 from an original sequence stored in storage device 74 to produce a residual sequence.

Residual modeling system 82 then generates a series of linear models and nonlinear models to represent the residual data sequence. Residual modeling system 82 then performs a comparison between the linear and nonlinear models. Such comparison may be performed, for example, by comparing a performance measure of an optimum linear model of the residual sequence with a performance measure of an optimum nonlinear model of the residual data sequence. Based upon the results of the comparison, residual modeling system 82 determines if the residual data sequence, is most accurately represented by the linear model or the nonlinear model.

If the residual sequence is most accurately represented by the linear model then modeling system 82 provides an output signal to output system 84 which indicates that the system is a linear system. If, on the other hand, modeling system 82 determines that the nonlinear model most accurately represents the residual data sequence, then modeling system 82 provides an output signal to output system 84 which indicates that the biological system is a nonlinear system.

As mentioned above, the techniques of the present invention may be applied to biological, physical, social, and economic systems such as the stock market (e.g. the Dow Jones index). One particular type of biological system which may be analyzed using the techniques of the present invention, for example, corresponds to a method of diagnosing heart disease from hemodynamic data.

Figure 4:
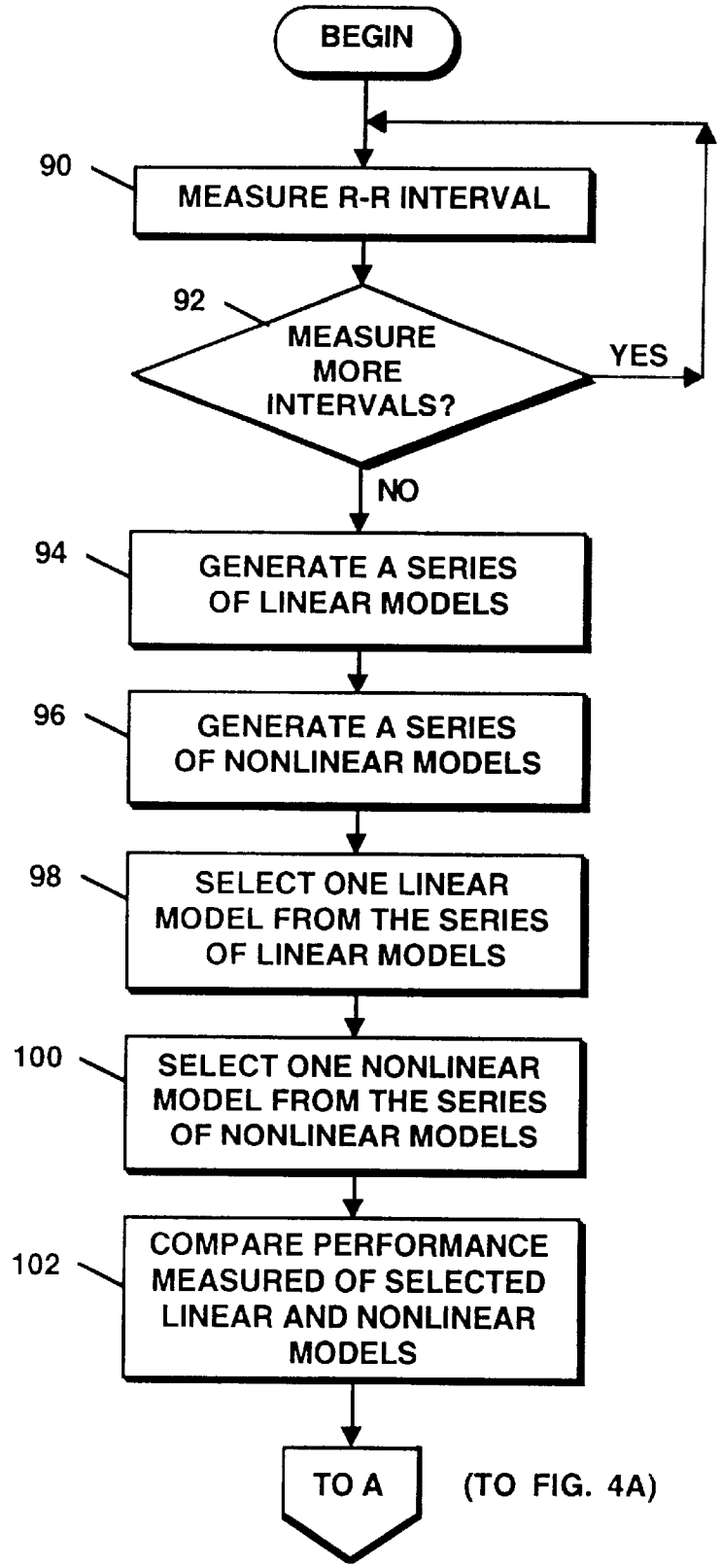
FIGS. 4–4B are a series of flow diagrams of the processing performed by the biological diagnostic system of FIG. 3.

Referring to FIG. 4, the steps related to analyzing R—R intervals in cardiac patients to identify the existence of nonlinearity in the R—R intervals are described. Steps 90 and 92 form a loop in which a plurality of R—R intervals are measured. Thus a series of R—R intervals typically in the range of about 100 to 50,000 intervals are measured. It should be noted that in a preferred embodiment between 500 and 2500 R—R intervals are measured. Those of ordinary skill in the art will appreciate of course that in some applications it may be desirable to measure more than 2500 intervals or fewer than 100 intervals or to segment the data into suitable intervals for relatively long data sets.

Figure 4A:
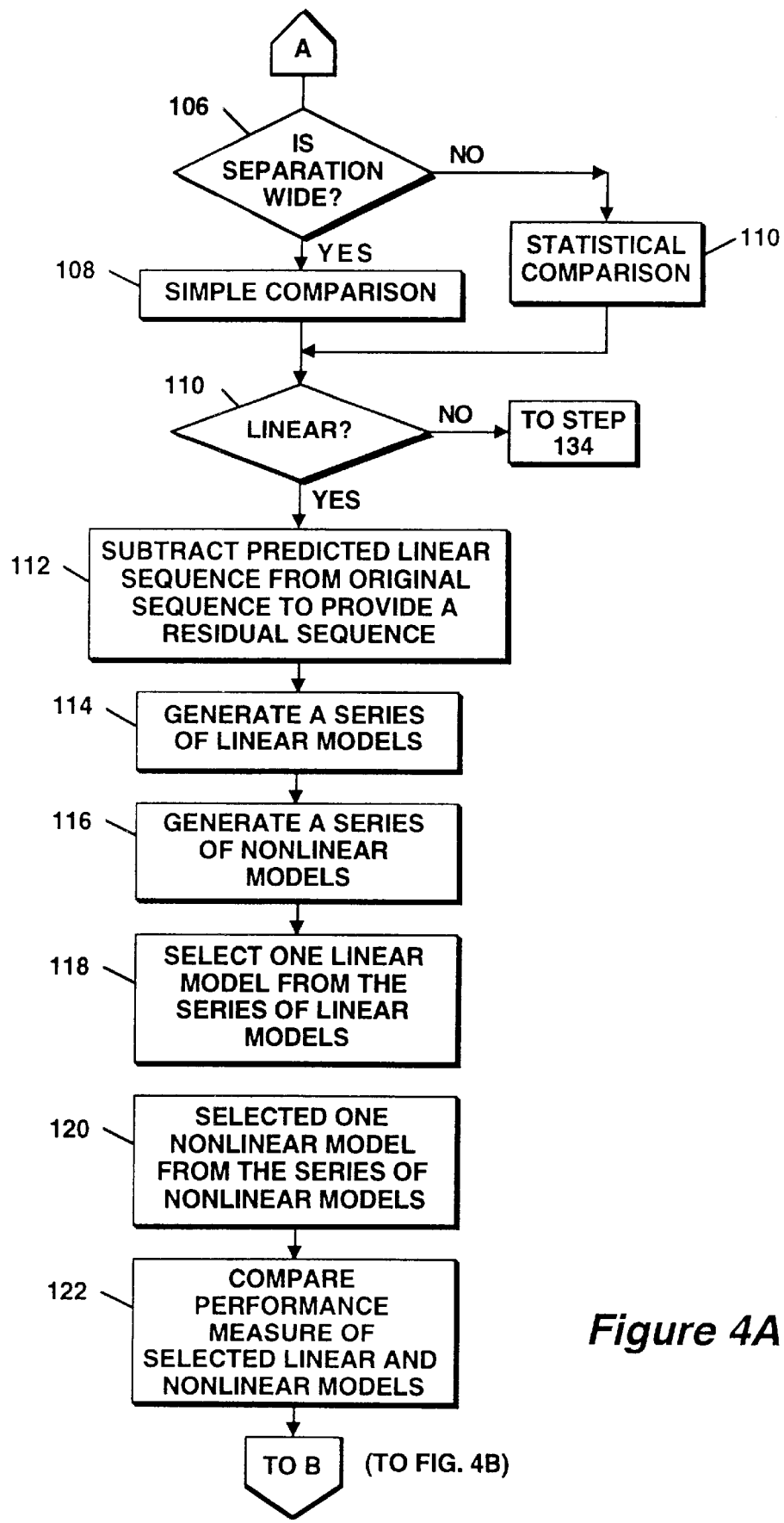
FIG. 4C is a plot of a sequence of R—R intervals.
FIG. 4D is a graph which shows the percentage of subsections of R—R intervals having linear and nonlinear components in healthy patients.
FIG. 4E is a graph of the percentage of R—R intervals having linear and nonlinear components for cardiac heart failure patients.
Figure 4B:
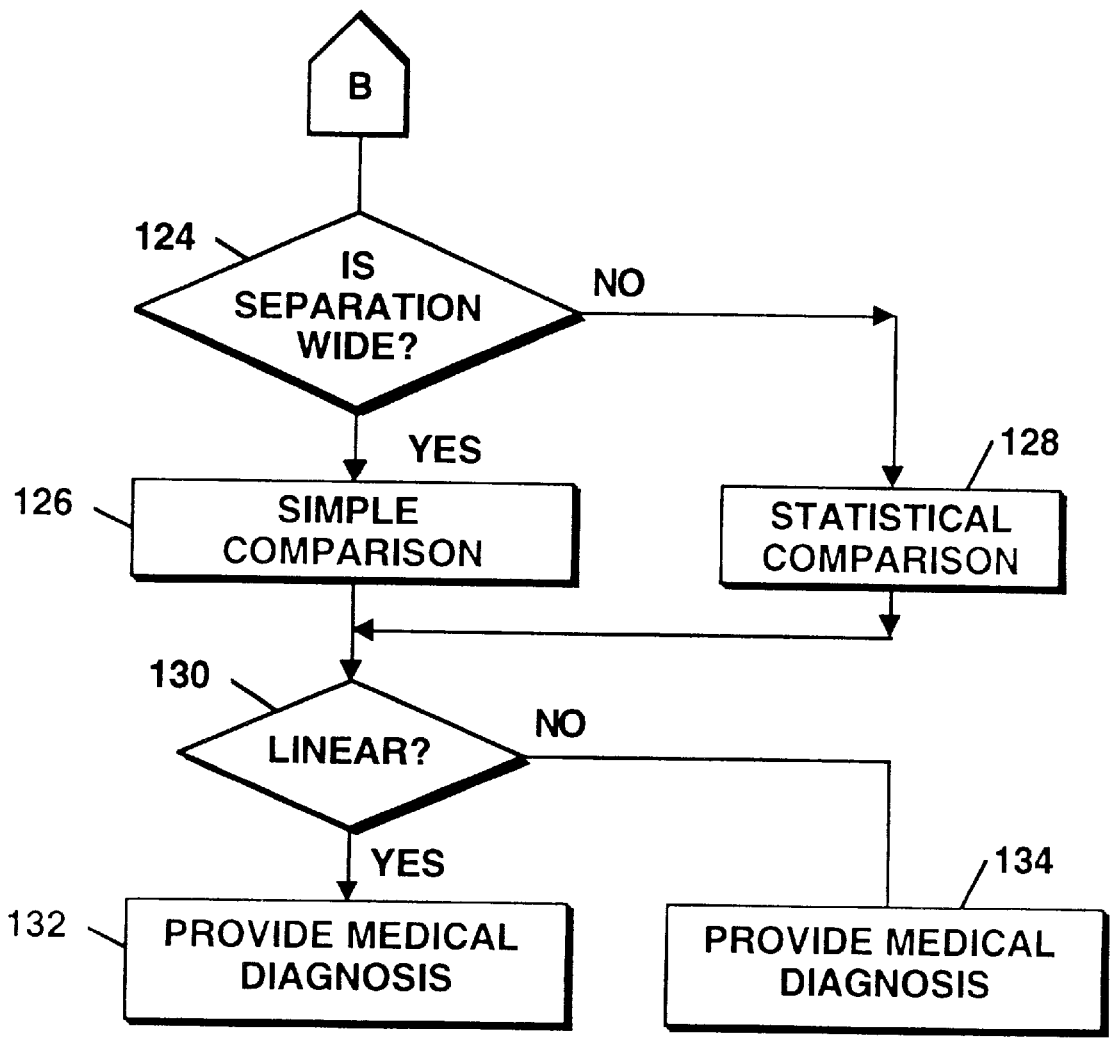
Figure 4C:
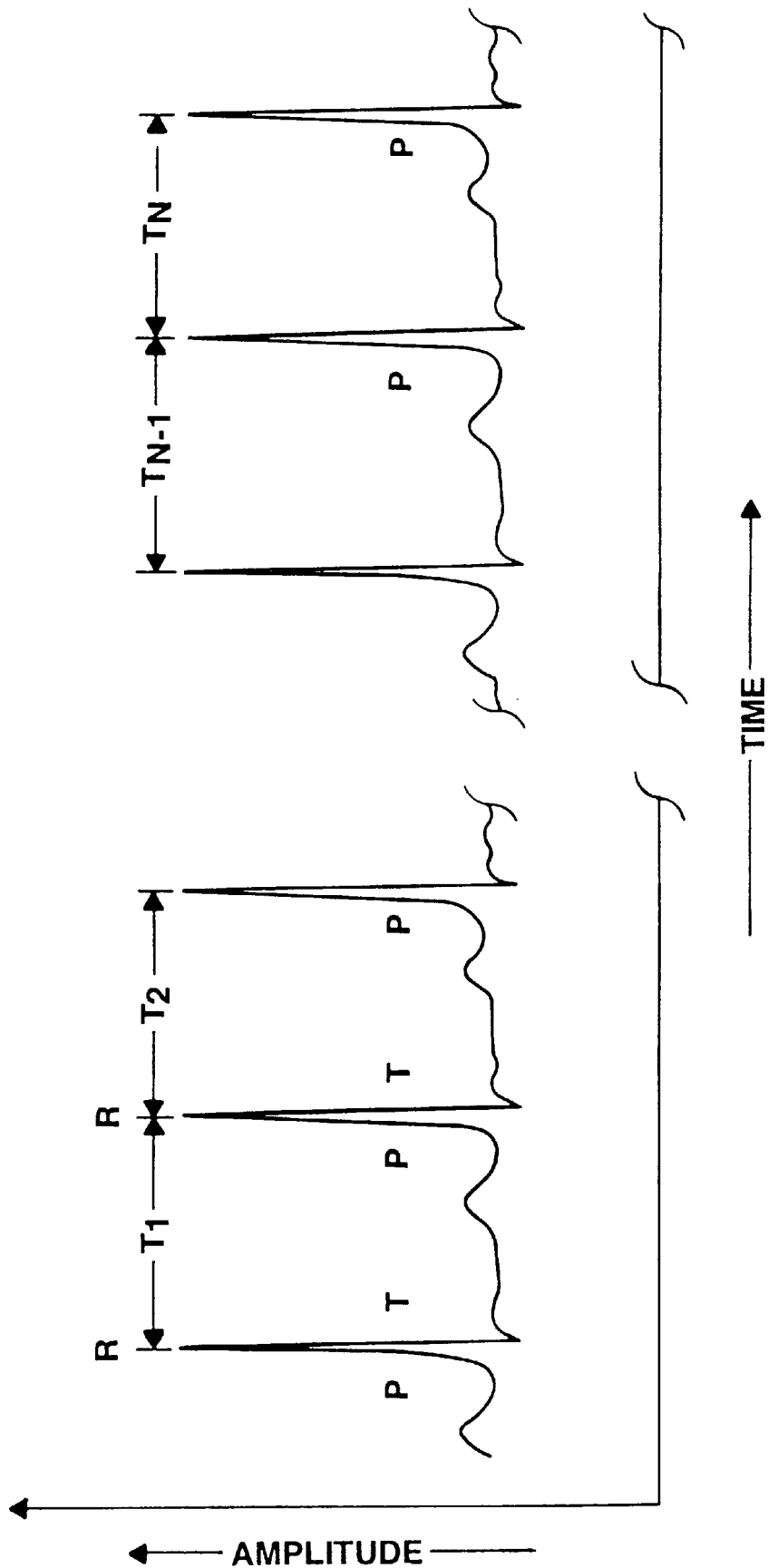

Referring briefly to FIG. 4C, a healthy heart beat is shown with a particular heart rate (BPM or beats per minute) with a standard deviation. Typically, variations in heart rate do not express a failure condition solely through statistical analysis.

The present method and apparatus contemplate location of the peak in the heart rate signal obtained by appropriately attaching to a patient, electrodes which provide an output of the heart beat signal. In a preferred embodiment of the present invention, the heart signal is sampled and digitized to thereby convert from analog to digital values. The sampling rate is typically in the range of about 128 to 512 samples per second with 300 being preferred. It should be noted, however, that collection of large amounts of data may lead to the need to store and process such data. Nevertheless an increase in the data sampling rate may lead to an increase in precision in the modeling of the data set. The sampling rate can be carried to a desired level of precision. In any event, sampling and digitizing is carried out typically at that rate. For purposes of digitizing, an analog to digital converter (ADC) makes measurements by means of a 12 or 14 bit digitizer. This level of accuracy or precision can be varied to obtain the precision desired. A sign bit is normally included with this data.

From beat to beat, the same part of the signal is located. This is preferably the peak which is normally termed the R complex, and as noted before, location of such peaks in a series of heart beats in effect measures the time interval from one beat to the next or the R—R interval. Other parts of the signal waveform can be detected, but it is generally easier to locate the R complex. As a generalization, the heart beat length evidences a certain degree of randomness which is indicative of a healthy heart, or one that is not subject to lethal cardiac arrest. More particularly, there is a measure of randomness that can be described as a specified range which is indicative of a healthy heart while in contrast a prearrest condition does exist where there is a conspicuous absence of randomness.

Referring again to FIG. 4A, once a predetermined number of R—R intervals has been measured to thus provide a data sequence, processing proceeds to steps 94, 96 where a series of linear models and nonlinear models are obtained for the R—R data sequence. The linear and nonlinear models may be provided as a closed-looped version of the Volterra-Wiener-Korenberg series discussed above in conjunction with FIG. 1, in which an output value $y_n$ loops back as a delayed input (i.e. $x_n = y_{n-1}$).

Next, as shown in step 98, a particular linear model is selected from the series of linear models generated in step 94. To select the linear model, a performance measure of each of the linear models is selected and computed. The performance measure of each of the linear models are compared to each other. The particular linear model which is selected is the linear model having a preferred performance measure. It should be noted that in some applications the preferred performance measure may not correspond to an optimum or best performance measure. The selected linear model has a preferred performance measure.

Similarly, as shown in step 100, a particular one of the nonlinear models is selected from the series of nonlinear models generated in step 96. To select the particular nonlinear model, a performance measure of the model is identified and this performance measure is computed for each of the nonlinear models in the series of nonlinear models.

The computed performance measures are compared and the nonlinear model having a preferred performance measure is selected. It should be noted that in some applications, the preferred performance measure may not correspond to an optimum or best performance measure.

In this particular embodiment, the performance measure is selected to be the Akaike Information Criteria (AIC). It should be noted that any one of a plurality of performance measures including but not limited to the AIC performance measure, a minimum description length measure, a log likelihood measure and a residual sum of square errors performance measures may also be used. The selection of a particular performance measure depends upon a variety of factors including but not limited to the amount and type of noise in the signal, the degree of nonlinearity and memory length of the system, and the length and discretization level of the data set.

The performance measures of the selected linear and nonlinear models having the preferred performance measures are then compared as shown in step 102. Next, as shown in decision block 106, a decision is made as to whether the separation between the performance measures of the selected linear and nonlinear models is relatively wide.

If the performance measure values are substantially different, processing continues to step 108 where a relatively simple comparison technique is used to compare the values. If on the other hand, the performance measure values are similar, processing continues to step 110 where a statistical comparison is performed between the preferred AIC value of the linear model and the preferred AIC value of the nonlinear model.

Once the preferred AIC values are identified and compared, processing continues to decision block 110 where decision is made as to whether the system is linear. That is, if the AIC value of the nonlinear model is less than the AIC value of the linear model, then this indicates that the nonlinear model represents the system from which the data set is taken better than the linear model and processing ends.

If on the other hand, the AIC value of the linear model is lower than the AIC value of the nonlinear model, then this indicates that the linear model represents the system from which the data set is taken better than the nonlinear model and processing continues to processing step 112 where a linear sequence predicted by the linear model is subtracted from the original sequence to produce a residual sequence. Then as shown in steps 114–128, linear and nonlinear models are generated, performance measures are computed and compared and processing flows to decision block 130 where a decision is then made as to whether the residual sequence is linear or not.

If the residual sequence is best represented as a linear model, than the system is identified as a non-chaotic system and a diagnosis as shown in step 132 is provided. If on the other hand the residual sequence is most accurately represented as a non linear model then the system is identified as a chaotic system and a diagnosis as shown in step 134 is provided.

Referring now to FIG. 4C, in this case, interbeat interval sequences were chosen as the output variable. As described above, an interbeat interval is the length of time between two beats. Interbeat intervals provide a natural discretization of the system. Each interbeat interval deeper into the past from the current beat provides a unit of memory for the algorithm. By choosing the interbeat interval as the discrete unit of the series to be analyzed, R is not necessary to interpolate between signal portions which could introduce artificial fractional memory terms into the sequence and require a large polynomial memory than is actually best for approximating the system.

Thus, in the case where biological system 73 (FIG. 3) corresponds to a human heart the present invention applies an analysis to the R—R interval measurements. Thus, these measurements are analyzed to locate a subtle representation of the randomness which is present in the data.

This has several benefits. The technique of the present invention provides a useful indicator with a smaller set of data. By contrast, conventional techniques require perhaps 5,000–50,000 or more heart beats. The present invention, however requires as few as only 500 heart beats, and R is thought to be possible to make this analysis wherein N is in the range of about 2500 or less, the lower limit not yet being determined. Moreover, the technique of the present invention provides an analysis relatively rapidly. Furthermore, the technique of the present invention may provide an indication for an individual as opposed to merely grouping the individual in broad categories (i.e., healthy versus unhealthy). The output of the present technique may provide a specific indication of vulnerability to lethal myocardial infarction (MI), sudden death or other cardiovascular abnormalities.

For example, a healthy heart may be indicated by a predetermined amount of chaotic activity while an unhealthy heart is indicated by a lack of chaotic activity. In very general terms, nonlinear analysis, as described herein, does not require stationarity of the biological generator (i.e., the human nervous system operating the heart in timed fashion) and relies on the lack of stationarities and makes measurements which are then used to determine whether a chaotic pattern exists. This involves processing the data sequences as described above in conjunction with FIGS. 4–4B. One of the benefits of the present technique is that the total amount of data required is relatively small compared with the amount of data required to identify nonlinearities using conventional techniques.

Another advantage of the present invention is that the data which is obtained by the system can be analyzed almost in real time. It can operate readily with a patient whose heart rate is in the range of 30–130 beats per minute (BPM) and thereby provide analysis of this data at rates depending upon the speed of the computer used. For example, a personal computer having adequate memory can perform the requisite operations in substantially real time. This can be accomplished using a conventional set of electrodes installed in a conventional pattern for measuring the heart beat and feeding the collected data directly to the personal computer.

Figure 4D:
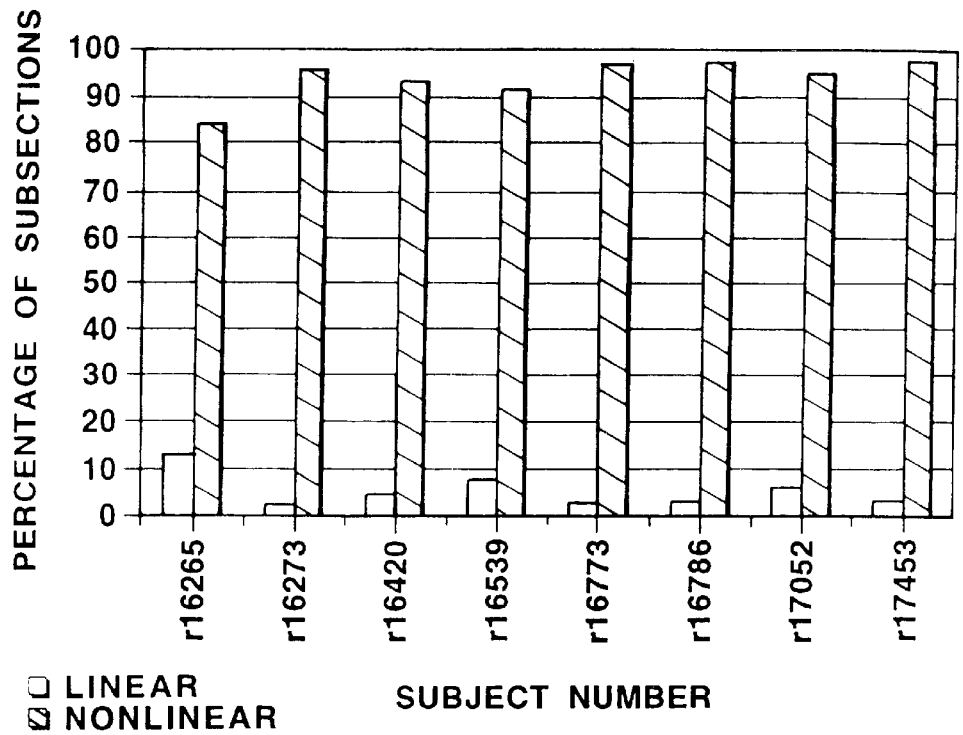
Figure 4E:
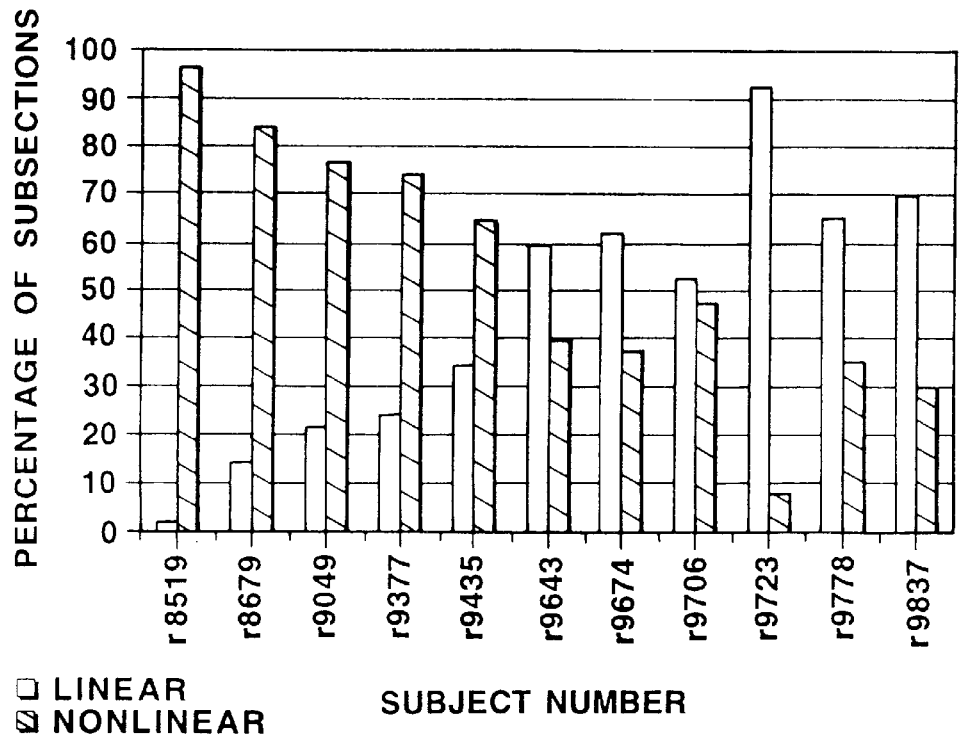

Referring now to FIGS. 4D and 4E, a pair of bar graphs representing the results of a Volterra Wiener analysis in accordance with the present invention of a series of interbeat intervals (an RR series) of healthy subjects FIG. 4D and congestive heart failure (CHF) patients FIG. 4E are shown. The graphs represent the histograms of the number of 500-point sections that are best fit by a linear or nonlinear Volterra model in each subject. It should be noted that the majority of the R—R series of healthy subjects are nonlinear whereas those of CHF patients frequently degenerate to linearity.

As mentioned above, it should also be noted that, when dealing with continuous signals, the time delay T for the embedding (or optimal sampling rate) is another free parameter to be determined. For detection purposes, an optimal time delay $T_{opt}$ may be selected to maximize the difference between the one step ahead prediction error for the nonlinear model using the original data set $\epsilon_{orig}^{lin}$ and the one step ahead prediction error for the nonlinear model using the original data set $\epsilon_{orig}^{nl}$. Thus, referring now to FIG. 5, a method of selecting a sample interval is shown to include step 136 where an initial sample interval is selected. It is preferable to select the initial sample interval to be the smallest available sample interval. Processing then continues to step 138 where linear and nonlinear models are generated and compared using the techniques discussed above in conjunction with FIGS. 1, 2 and 4.

Processing then flows to decision block 140 where a decision is made as to whether the data set contains a nonlinear component. If the data set does not contain a nonlinear component then processing continues to step 142 where a new interval is selected and a new set of linear and nonlinear models are generated. If in decision block 140 a decision is made that a nonlinear component exists then processing ends. As noted above, in order to select an optimal time delay $T_{opt}$, steps 138, 140, and 142 are repeated until a maximum nonlinear predictability is determined (i.e., a maximum prediction power of the nonlinear model or, stated differently, the best nonlinear prediction as compared with a linear prediction). That is, steps 138, 140, and 142 are repeated until the difference between the original data set $\epsilon_{orig}^{lin}$ and the original data set $\epsilon_{orig}^{nl}$ (which may be expressed as $\Delta(\tau)=\epsilon_{orig}^{nl}(\tau)-\epsilon_{orig}^{lin}(\tau)$) no longer decreases with increasing $\tau$.

The value of $T_{opt}$ is bounded by two limits. On one hand, if $T>>T_{opt}$ (under-sampling) all four models (linear and nonlinear, original or surrogate) will have similarly small prediction powers and nonlinearity cannot be detected. On the other hand, for an over-sampled data series with a small step size ($T<<T_{opt}$), the linear correlation of the embedding is so large that linear models always prevail. Within the range of acceptable time delays where $T_{opt}$ lies, generally the standard deviation of the linear models for both the original and surrogate data sets $\epsilon_{orig}^{lin} \approx \epsilon_{surr}^{lin}$ are approximately equal i.e., That is, when optimally sampled, the prediction power of the linear model of a continuous signal derives mainly from its autocorrelation function.

Figure 6:
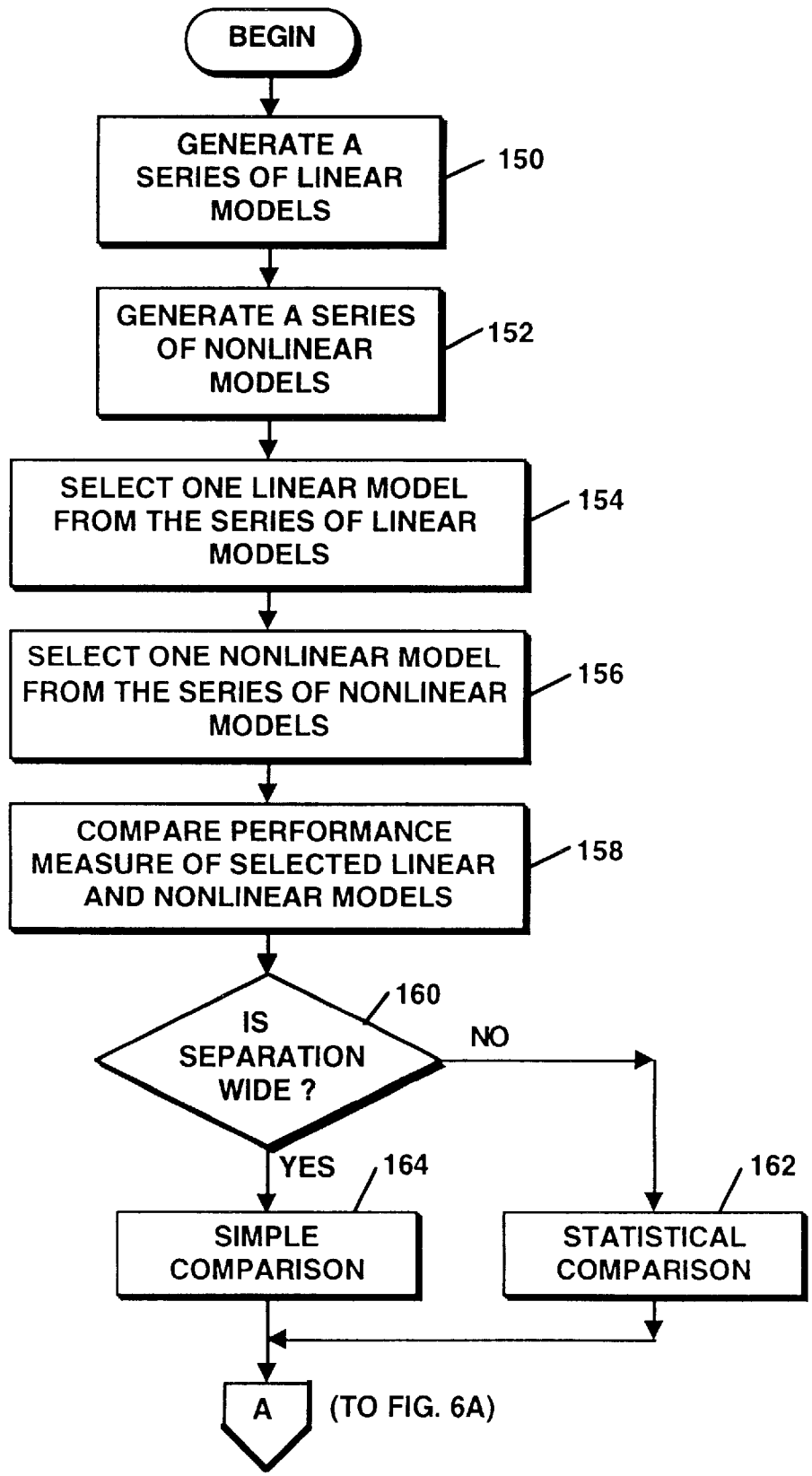
FIGS. 6–6A are a series of flow diagrams of an alternate processing technique performed by the system of FIG. 1 to determine whether a signal generated by an autonomous (i.e., non-driven and time-invariant), dynamical system includes nonlinear components and further, to determine whether the nonlinear dynamical system is chaotic and to what extent.
Figure 6A:
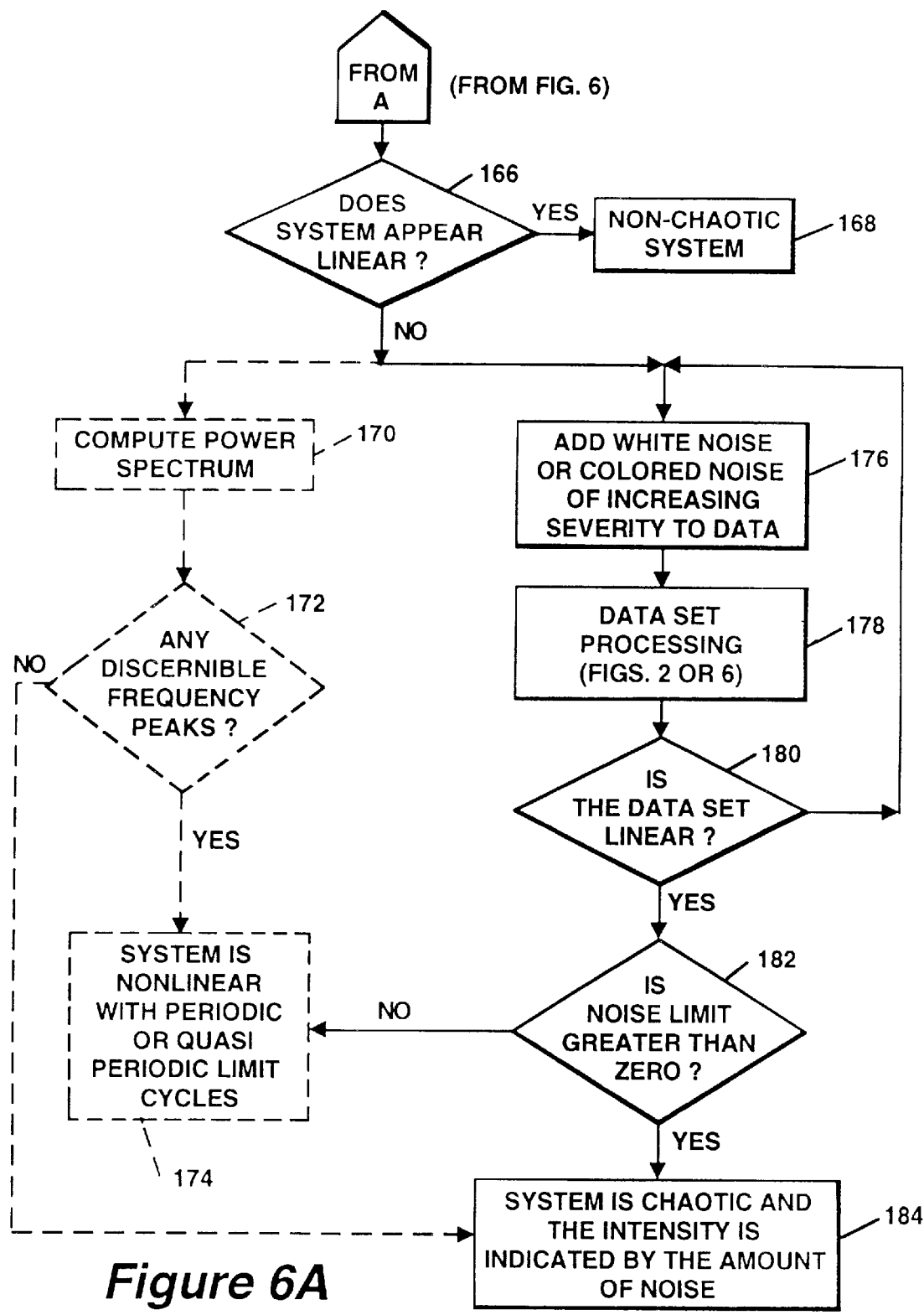

Referring now to FIGS. 6 and 6A, a method is illustrated for determining whether a signal generated by an autonomous (i.e., non-driven and time-invariant), dynamical system includes nonlinear components and further for determining whether the nonlinear dynamical system is chaotic and to what extent. The method of FIG. 6 is substantially identical to that of FIG. 2, with steps 150–162 of FIG. 6 corresponding to steps 26–40 of FIG. 2. By way of brief overview, in steps 150, 152, a series of linear models and nonlinear models are obtained for a data sequence, or data set representing the dynamical system signal. As noted above, the data sequence may be selected and stored for later processing or the data sequence may be collected and the linear and nonlinear models may be generated in real time. Further, various types of linear and nonlinear models may be used, as described above in conjunction with FIG. 2.

In step 154, a particular linear model is selected from the series of linear models generated in step 150 based on a performance measure of each of the linear models. More particularly, a performance measure of each of the linear models is computed and the computed performance measures are compared to one another. The particular linear model is selected based on which of the linear models has a preferred performance measure.

Similarly, in step 156, a particular one of the nonlinear models is selected from the series of nonlinear models generated in step 152. Again, the particular selected nonlinear model is based on a performance measure which is computed for each of the nonlinear models and compared to one another, with the particular selected nonlinear model being the one having a preferred performance measure. As noted above in conjunction with FIG. 2, various types and numbers of performance measures may be used in steps 154 and 156.

In step 158, the performance measure of the selected linear model and the selected nonlinear model are compared. In block 160, a decision is made as to whether the separation between the performance measure of the selected linear model and the performance measure of the selected nonlinear model is relatively wide. In the event that the performance measures are separated by a relatively wide distance, then a relatively simple comparison technique can be used to compare the two values in step 164. Alternatively however, if the performance measures are not separated by a relatively wide distance, then it may be desirable to use a statistical approach to compare the two performance measures as shown in step 162.

In step 166 (FIG. 6A), it is determined whether the system appears linear based on the comparison of the performance measures of the selected linear and nonlinear models. That is, if the selected linear model represents the system from which the data set is taken better than the selected nonlinear model, then the system is determined to be linear; whereas, if the nonlinear model represents the system better than the linear model, then the system is determined to be nonlinear. As one example, in applications in which the performance measure used is the AIC value, then a lower AIC value indicates a better representation of the system than a higher AIC value, as described above in conjunction with FIG. 2.

If, based on the comparison of performance measures in step 166, the system is determined to be linear, then the system can be characterized as non-chaotic as shown in step 168. Alternatively, if the system does not appear to be linear, then processing continues in order to determine whether the nonlinear system is chaotic or has periodic or quasi-periodic limit cycles.

More particularly, there are four possible states of an autonomous (non-driven and time-invariant) nonlinear system: (1) chaotic; (2) periodic; (3) quasi-periodic; and (4) equilibrium. If in step 166, a decision is made that the system is nonlinear, it is desirable to further process the data to determine whether the nonlinear system is chaotic and, if so, to what extent. This is because the strength of chaos detected in certain biological systems, such as systems represented by an electrocardiograph signal, has a high correlation to cardiac health. In particular, it has been recognized that the electrocardiograph signals of healthy cardiac patients exhibit a high degree of chaos, whereas patients with compromised cardiac health, such as those with congestive heart failure (CHF), generally have electrocardiograph signals exhibiting significantly less chaos. To this end, steps 176–184 illustrate a preferred way of determining whether the nonlinear system is chaotic and, further, for providing an indication of the relative strength of detected chaos. Steps 170–174 illustrate an optional, additional way of determining whether the nonlinear system is chaotic or has periodic or quasi-periodic limit cycles. That is, steps 170–174 illustrate a processing technique for detecting strange non-chaotic attractors and quasi-periodic systems. In applications in which it desirable to perform steps 170–174 in addition to steps 176–184, the two sets of steps may be performed simultaneously or sequentially.

Considering first the method of steps 176–184, a noise signal is added to the data set generated from a signal of the analyzed system in step 176. Various types of noise signals are suitable, including white noise or colored noise. The noise signal is selected to have a predetermined standard deviation ($\sigma$). It will be appreciated by those of ordinary skill in the art that the standard deviation of the noise signal is selected based on a variety of factors including permissible computation time (i.e., since the smaller the standard deviation, the more noise increments that have to be added and thus, the longer the computation time) and the separation between the linear model and nonlinear model curves. That is, if a relatively large separation exists between the curves, then a noise signal having a relatively large standard deviation may be used. The result of step 176 is a test signal which differs from the data set representing the analyzed system by the addition of the noise signal.

In step 178, the test signal is processed in the manner described in conjunction with FIGS. 2 and 6. That is, series of linear and nonlinear models are generated from the test signal, one of the linear models and one of the nonlinear models is selected based on a preferred performance measure and the performance measures of the selected linear and nonlinear models are compared. Further, a determination is made as to whether the separation between the performance measures of the selected linear and nonlinear models is relatively wide and an appropriate comparison is made between such performance measures as a function of their separation, as described above.

In step 180, it is determined whether the test signal data set appears linear. This determination is based on whether the performance measure of the selected linear model better represents the system than the performance measure of the selected nonlinear model, as described above in connection with step 42 of FIG. 2A and step 166 of FIG. 6A. If the test signal data set does not appear linear, then steps 176–178 are repeated, as shown. That is, additional noise of increasing intensity is added to the test signal to generate a next test signal and the next test signal is processed in step 178 as described above.

Process steps 176–180 continue to be repeated until a determination is made in step 180 that the test signal data set appears linear. Thus, the processing loop of steps 176–180 results in noise of increasing severity being added to the original data set representing the analyzed system until the resulting test signal data set is linear.

In decision block 182, it is determined whether the noise limit of the test signal data set is greater than zero. The noise limit is defined as the maximum standard deviation ($\sigma$) at which nonlinearity in the signal is detected. If the test signal which is determined to represent a linear system in step 180 has a noise limit greater than zero, then the dynamical system is determined to be chaotic in step 184. Alternatively, if the noise limit of the test signal is approximately zero, then the system is determined to be nonlinear with periodic or quasi-periodic limit cycles in step 174.

Further, the relative strength of the chaos is indicated by the amount of noise added to the data set in order to generate the linear test signal. In particular, the noise level is roughly proportional to the strength of the chaos, with the proportionality constant being a function of the system. The chaos strength thus provided can be used in further process steps to diagnose certain cardiac conditions based on the correlation between chaos levels in electrocardiograph signals and cardiac health, as described in a paper entitled Decrease of Cardiac Chaos in Congestive Heart Failure, published in Nature, Vol. 389, Oct. 2, 1997, which paper is incorporated herein by reference in its entirety.

As noted above, it is sometimes desirable to further process the data set representing the analyzed system in order to confirm in an alternate manner whether the system has periodic or quasi-periodic limit cycles. To this end, in step 170, the power spectrum of the data set is computed. In step 172, it is determined whether any visually discernable frequency peaks exist in the computed power spectrum. In the event that discernable frequency peaks are determined to exist, then the system is characterized as nonlinear with periodic or quasi-periodic limit cycles in step 174. Alternatively, if no discernable frequency peaks exist, then it is determined that the system is chaotic in step 184. Further, the intensity of the chaos is a function of the amount of noise added to the data set which caused the resulting test signal to appear linear in step 180. It must be noted, however, that the procedure of steps 170–174 is supplementary to the main procedure of steps 176–184 described above and is not sufficient in itself in detecting chaos.

Figure 7:
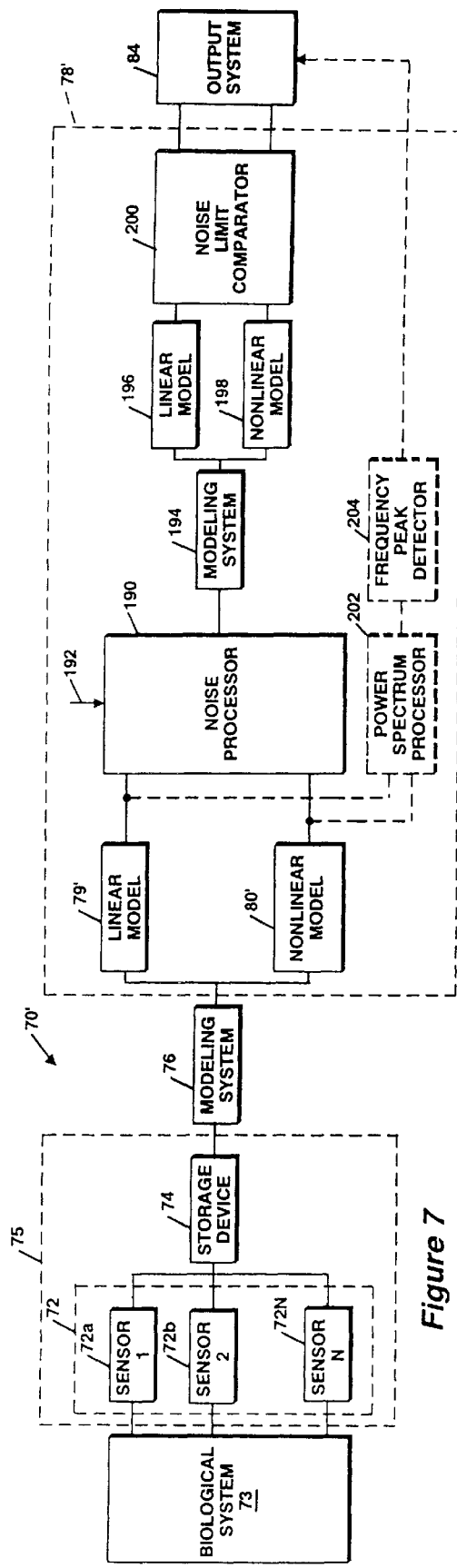
FIG. 7 is a block diagram of an alternate biological diagnostic system according to the invention.

Referring now to FIG. 7, an alternate biological diagnostic system 70' includes many of the elements of the biological diagnostic system 70 of FIG. 3, with like elements labelled with like reference numbers. In particular, the biological diagnostic system 70' includes a sensor system 72 having a plurality of sensors 72a–72N, each of which is coupled to the biological system 73. The sensors 72a–72N may take various forms as described above in conjunction with FIG. 3. Sensor system 72 provides analog or digital output signals to a storage device 74. Modeling system 76 receives data from the storage device 70 and generates a linear and a nonlinear model of the biological system 73. The resulting linear and nonlinear models are fed to a performance measurement system 78' which, in addition to determining whether the system 73 includes nonlinear components, also determines whether the system is chaotic and if so, to what extent. The manner by which the performance measurement system 78' determines whether the biological system 73 includes nonlinear components is as described above. In particular, the performance measurement system 78' compares a performance measure of the linear model 79' with a performance measure of the nonlinear model 80' and, based on the results of the comparison, provides an output signal indicating whether the system 73 is most accurately represented by the linear or nonlinear model. If the system 73 is most accurately represented by the nonlinear model, then the output signal indicates that the system includes a nonlinear component.

In response to an indication that the system includes a nonlinear component, a noise processor 190 of the performance measurement system 78' adds a noise signal 192 to the data set representing the system 73 to generate a test signal which is coupled to a further modeling system 194. The modeling system 194 is substantially identical to modeling system 76 and is operative to generate a linear model 196 and a nonlinear model 198 of the test signal and to compute a performance measure of each such model. The performance measures of the two test signal models are compared in order to determine which model most accurately represents the test signal. If the performance measure of the linear model is a preferred performance measure as compared to the performance measure of the nonlinear model, then the test signal is determined to be linear. The noise processor 190 iteratively adds additional noise to the data set representing the system 73 until a determination is made that the resulting test signal is linear.

Once it is determined that the resulting test signal is linear, a noise limit comparator 200 determines whether the noise limit of the resulting test signal (i.e., the test signal determined to be linear) is greater than zero. A greater than zero noise limit is indicative of a chaotic system and causes an output signal to be provided to the output system 84 so characterizing the system as chaotic. Alternatively, if the noise limit comparator 200 determines the noise limit of the linear test signal to be approximately zero, then the output signal of the comparator 200 indicates that the system 73 is not chaotic, but rather is nonlinear with quasi-periodic or periodic limit cycles.

Optionally, the performance measurement system 78' may further include a power spectrum processor 202 and a frequency peak detector 204. The power spectrum processor 202 is operative to compute the power spectrum of the data set representing the system 73 in response to a determination that the system includes a nonlinear component. The frequency peak detector 204 receives the power spectrum and determines whether there are any visually discernible frequency peaks in the power spectrum. In the event that the power spectrum is determined to contain discernible frequency peaks, then the frequency peak detector 204 provides an output signal to the output system 84 indicating that the system contains periodic or quasi-periodic limit cycles. Alternatively, if the power spectrum does not contain discernible frequency peaks, then the frequency peak detector 204 provides an output signal indicating that the system 73 is chaotic.

The apparatus and techniques of FIGS. 6, 6A and 7 provide a robust test for detecting the presence of chaos in an autonomous (i.e., non-driven and time-invariant), dynamical system and the extent of any such chaos. These arrangements are based on a recognition that the presence of chaos can be reliably tested by adding noise, since, in the presence of noise, non-chaotic forms of nonlinear determinism, such as limit cycles and quasiperiodicity, become indistinguishable from oscillatory linear systems. The methods and apparatus of the present invention are well suited for detecting the presence and extent of chaos in biological systems in which the analyzed signal is an electrocardiograph signal, since the level of noise corruption that can be tolerated provides a measure of the degree of chaos and further since the intensity of cardiac chaos has been found to decrease in CHF patients.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A method for analyzing a biophysical signal to determine the presence of a nonlinear pattern in the biophysical signal, the method comprising the steps of:

(a) converting a series of intervals in the biophysical signal into time segments, each time segment having a value, with a sequence of such values representing the biophysical signal;

(b) determining if a nonlinear model predicts a value of the biophysical signal;

(c) in response to the nonlinear model predicting a value of the biophysical signal, adding a noise signal to the biophysical signal to provide a first test biophysical signal;

(d) determining if the nonlinear model predicts a value of the first test biophysical signal;

(e) in response to the nonlinear model predicting a value of the first test biophysical signal, adding a next noise signal to the first test biophysical signal to provide a next test biophysical signal; and (f) repeating steps (d) and (e) until the nonlinear model no longer predicts a value of the next test biophysical signal.

2. The method of claim 1 further comprising the steps of:

(g) determining if a noise limit of the next test biophysical signal is greater than zero; and (h) in response to the noise limit of the next test biophysical signal being greater than zero, providing an output signal indicating that the biophysical signal is chaotic.

3. The method of claim 2 further comprising the step of:

(i) in response to the noise limit of the next test biophysical signal being greater than zero, providing an output signal indicating the intensity of the chaos of the biophysical signal in response to the noise level of the next noise signal.

4. The method of claim 1 wherein the step of determining if the nonlinear model predicts a value of the first test biophysical signal comprises the steps of:

(i) generating a linear model to represent a first sequence of values of the first test biophysical signal;

(ii) generating a nonlinear model to represent the first sequence of values of the first test biophysical signal;

(iii) computing a performance measure of the linear model;

(iv) computing a performance measure of the nonlinear model;

(v) comparing the performance measure of the linear model to the performance measure of the nonlinear model; and (vi) in response to the performance measure of the nonlinear model being a preferred performance measure, indicating that the nonlinear model predicts a value of the first test biophysical signal.

5. The method of claim 1 wherein the step of determining if a nonlinear model predicts a value of the biophysical signal comprises the steps of:

(i) generating a linear model to represent a first sequence of values of the biophysical signal;

(ii) generating a nonlinear model to represent the first sequence of values of the biophysical signal;

(iii) computing a performance measure of the linear model;

(iv) computing a performance measure of the nonlinear model;

(v) comparing the performance measure of the linear model to the performance measure of the nonlinear model; and (vi) in response to the performance measure of the nonlinear model being a preferred performance measure, indicating that the nonlinear model predicts a value of the biophysical signal.

6. A method for detecting a chaotic signal component in a nonlinear pattern of a biosignal, comprising the steps of:

(a) adding a noise signal to the biosignal to provide a test biosignal;

(b) determining if a nonlinear model predicts a value of the test biosignal;

(c) in response to the nonlinear model predicting the value of the test biosignal, adding a next noise signal to the test biosignal to provide a next test biosignal; and (d) repeating steps (a)–(c) until the nonlinear model no longer predicts a value of the next test biosignal.

7. The method of claim 6 further comprising the steps of:

(e) determining if a noise limit of the next test biosignal is greater than zero; and (f) in response to the noise limit of the next test biosignal being greater than zero, providing an output signal indicating that the biosignal is chaotic.

8. The method of claim 7 further comprising the step of:

(g) in response to the noise limit of the next test biosignal being greater than zero, providing an output signal indicating the intensity of the chaos exhibited by the biosignal in response to the noise level of the next noise signal.

9. The method of claim 6 wherein the step of determining if a nonlinear model predicts a value in the test biosignal comprises the steps of:

(i) generating a linear model to represent a first sequence of values corresponding to measured intervals of the test biosignal;

(ii) generating a nonlinear model to represent the first sequence of values corresponding to measured intervals of the test biosignal;

(iii) computing a performance measure of the linear model;

(iv) computing a performance measure of the nonlinear model; and (v) comparing the performance measure of the linear model to the performance measure of the nonlinear model.

10. The method of claim 9 further comprising the steps of:

(vi) identifying which of the first and second performance measures is a preferred performance measure; and (vii) providing an output signal indicating whether the nonlinear model predicts a value in the test biosignal in response to which of the first and second performance measures is the preferred performance measure.

11. A method for detecting a chaotic signal component in a nonlinear pattern of a biosignal, comprising the steps of:

(a) adding a noise signal to the biosignal to provide a test biosignal;

(b) determining if a nonlinear model predicts a value in the test biosignal;

(c) in response to the nonlinear model not predicting a value in the test biosignal, determining if a noise limit of the test biosignal is greater than zero; and (d) in response to the noise limit of the test biosignal being greater than zero, providing an output signal indicating that the biosignal is chaotic.

12. The method of claim 11 further comprising the step of:

(e) in response to the noise limit of the test biosignal being greater than zero, providing an output signal indicating the intensity of the chaos in response to the noise level of the noise signal.

13. The method of claim 11 further comprising the steps of:

(e) in response to the nonlinear model predicting a value in the test biosignal, adding a next noise signal to the test biosignal to provide a next test biosignal; and (f) repeating steps (b)–(e) until the nonlinear model no longer predicts a value of the next test biosignal.

14. The method of claim 11 further comprising the steps of:

(e) computing the power spectrum of the test biosignal;

(f) determining if there are any discernible frequency peaks in the power spectrum of the test biosignal; and (g) in response to there being no discernible frequency peaks in the power spectrum of the test biosignal, indicating that the biosignal is chaotic.

15. Apparatus for detecting a nonlinear component in an autonomous, dynamical system and for determining whether the system determined to include a nonlinear component is chaotic, comprising:

(a) a modeling system comprising:

(i) a modeling processor for representing a signal from the dynamical system with a linear model and a nonlinear model; and (ii) a performance processor for computing a first performance measure of the linear model and for computing a second performance measure of the nonlinear model; and (b) a performance measurement system coupled to the modeling system, said performance measurement system comprising:

(i) a comparison processor for receiving and comparing the first and second performance measures;

(ii) a selection processor for identifying which of the first and second performance measures is a preferred performance measure and for providing an output signal indicating whether the signal from the dynamical system includes a nonlinear component based on whether the preferred performance measure is associated with the linear model or the nonlinear model;

(iii) a noise processor for iteratively adding noise of predetermined intensity to the signal from the dynamical system in response to the output signal indicating that the signal from the dynamical system includes a nonlinear component in order to generate a test signal until the test signal appears linear; and (iv) a noise limit comparator for determining whether the noise limit of the test signal is greater than zero and for providing an output signal indicating that the dynamical system is chaotic in response to the noise limit being greater than zero.

16. The apparatus of claim 15 wherein the performance measurement system further comprises:

(v) a power spectrum processor for computing the power spectrum of the signal representing the dynamical system in response to the output signal indicating that the signal from the dynamical system includes a nonlinear component; and (vi) a frequency peak detector for detecting whether the power spectrum includes discernible frequency peaks and for providing an output signal indicating that the dynamical system is not chaotic in response to detection of discernible frequency peaks.

17. A method for detecting a chaotic signal component in a nonlinear pattern of a signal generated by an autonomous, dynamical system, comprising the steps of:

(a) adding a noise signal to the signal to provide a test signal;

(b) determining if a nonlinear model predicts a value of the test signal;

(c) in response to the nonlinear model predicting the next value of the test signal, adding a next noise signal to the test signal to provide a next test signal; and (d) repeating steps (a)–(c) until the nonlinear model no longer predicts a value of the next test signal.

* * * * *